US008599918B2

United States Patent
Yoshida et al.

(10) Patent No.: US 8,599,918 B2
(45) Date of Patent: Dec. 3, 2013

(54) VIDEO COMPRESSION ENCODING/DECOMPRESSION DEVICE, VIDEO COMPRESSION ENCODING/DECOMPRESSION PROGRAM AND VIDEO GENERATION/OUTPUT DEVICE

(75) Inventors: Shigeru Yoshida, Gamagori (JP); Junichi Odagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 12/759,509

(22) Filed: Apr. 13, 2010

(65) Prior Publication Data

US 2010/0195724 A1 Aug. 5, 2010

Related U.S. Application Data

(63) Continuation of application No. PCT/JP2007/001135, filed on Oct. 18, 2007.

(51) Int. Cl.
*H04N 11/02* (2006.01)
(52) U.S. Cl.
USPC .................................................. 375/240.12
(58) Field of Classification Search
None
See application file for complete search history.

(56) References Cited

U.S. PATENT DOCUMENTS

| 5,003,307 | A | 3/1991 | Whiting et al. |
|---|---|---|---|
| 5,016,009 | A | 5/1991 | Whiting et al. |
| 5,126,739 | A | 6/1992 | Whiting et al. |
| 5,146,221 | A | 9/1992 | Whiting et al. |
| 5,414,425 | A | 5/1995 | Whiting et al. |
| 5,463,390 | A | 10/1995 | Whiting et al. |
| 5,506,580 | A | 4/1996 | Whiting et al. |
| 5,532,694 | A | 7/1996 | Mayers et al. |
| 5,995,660 | A * | 11/1999 | Andoh et al. ................. 382/181 |

(Continued)

FOREIGN PATENT DOCUMENTS

| EP | 1696666 A1 * | 8/2006 |
|---|---|---|
| EP | 1781043 A1 * | 5/2007 |

(Continued)

OTHER PUBLICATIONS

T. Usubuchi et al.; Data Compression of Newspaper Pages Using Adaptive Prediction; published in (a) Technical Report of the Institute of Electronics Information and Communication Engineers, IE78-55; pp. 9-16 and (b) Technical Report of the Institute of Image Information and Television Engineers, vol. 2, No. 13, IT34-2; pp. 9-16.

(Continued)

*Primary Examiner* — Mehrdad Dastouri
*Assistant Examiner* — James Anderson, II
(74) *Attorney, Agent, or Firm* — Staas & Halsey LLP

(57) ABSTRACT

When a periodic pattern is not included in image data 210, a prediction error encoding unit 204 outputs the variable-length code of a prediction error quantization value 214 generated by prediction encoding as compressed data 215. When the periodic pattern is included in the image data 210, a periodic pattern encoding unit 208 outputs only information about the periodic pattern as the compressed data 215, while the output of the prediction error encoding unit is stopped. On the decompression side, while the copy instruction of a pixel value before one cycle from the compressed data is not detected, the decompression operation in a normal prediction encoding system is executed. When the instruction is detected, the pixel value one cycle before, internally stored is copied and outputted.

20 Claims, 22 Drawing Sheets

(56) References Cited

U.S. PATENT DOCUMENTS

| | | |
|---|---|---|
| 6,268,809 B1 | 7/2001 | Saito |
| 7,142,600 B1 * | 11/2006 | Schonfeld et al. ....... 375/240.16 |
| 7,245,396 B2 | 7/2007 | Sakamoto |
| 7,808,552 B1 * | 10/2010 | Wang et al. .................. 348/449 |
| 2003/0107753 A1 | 6/2003 | Sakamoto |
| 2004/0233991 A1 * | 11/2004 | Sugimoto et al. ........ 375/240.16 |
| 2008/0043853 A1 * | 2/2008 | Kawa ....................... 375/240.29 |

FOREIGN PATENT DOCUMENTS

| | | |
|---|---|---|
| JP | 6-54211 | 2/1994 |
| JP | 10-70654 | 3/1998 |
| JP | 11-168389 | 6/1999 |
| JP | 2003-174564 | 6/2003 |
| JP | 2003-264703 | 9/2003 |

OTHER PUBLICATIONS

International Search Report issued Jan. 29, 2008 in corresponding PCT/JP2007/001135.

* cited by examiner

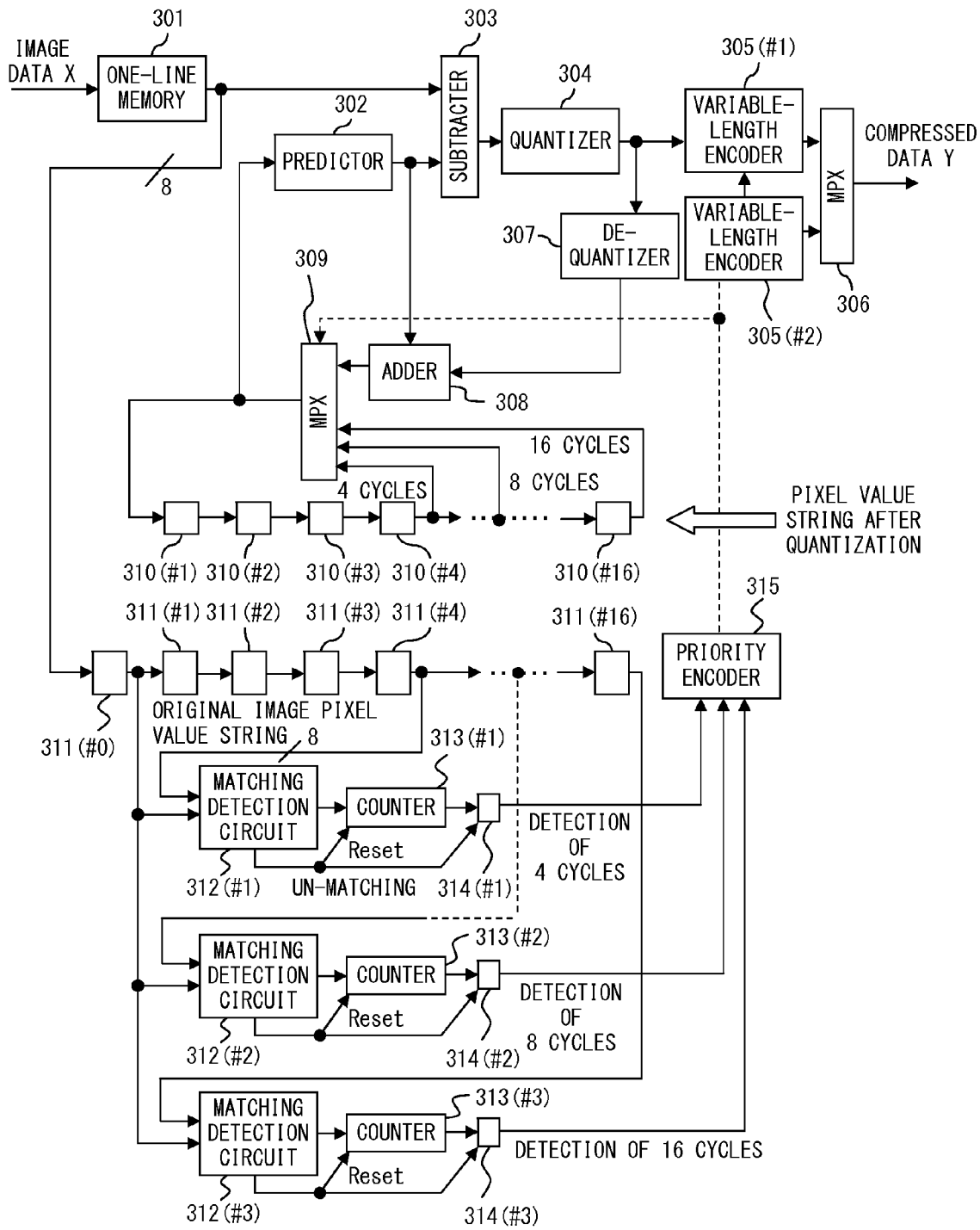
F I G. 3

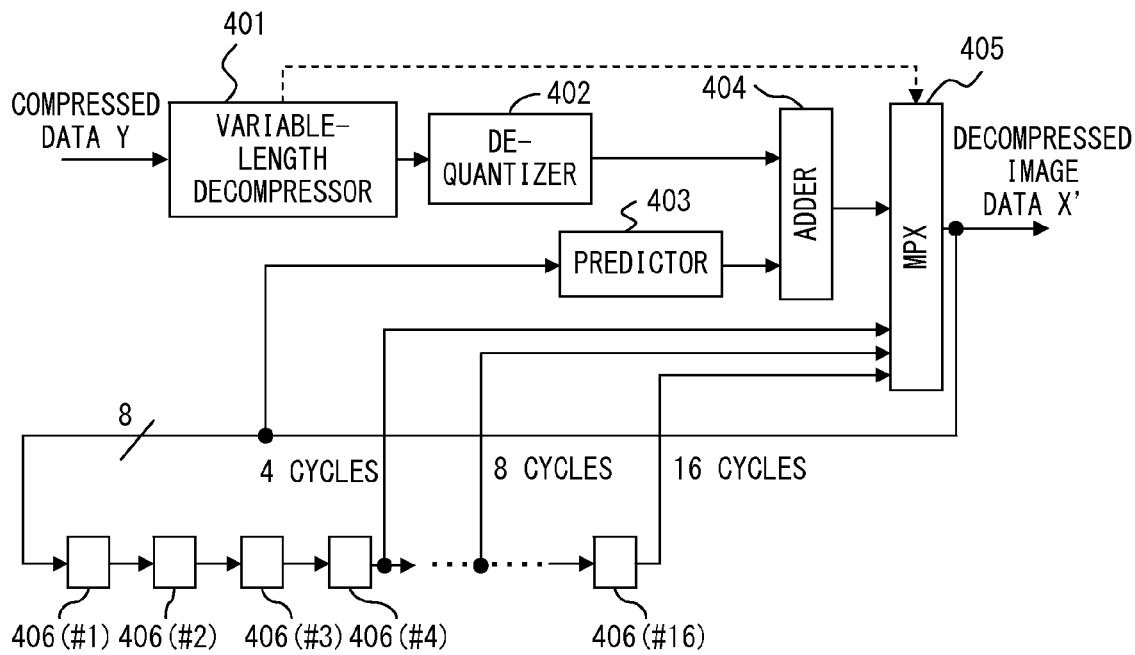
F I G. 4

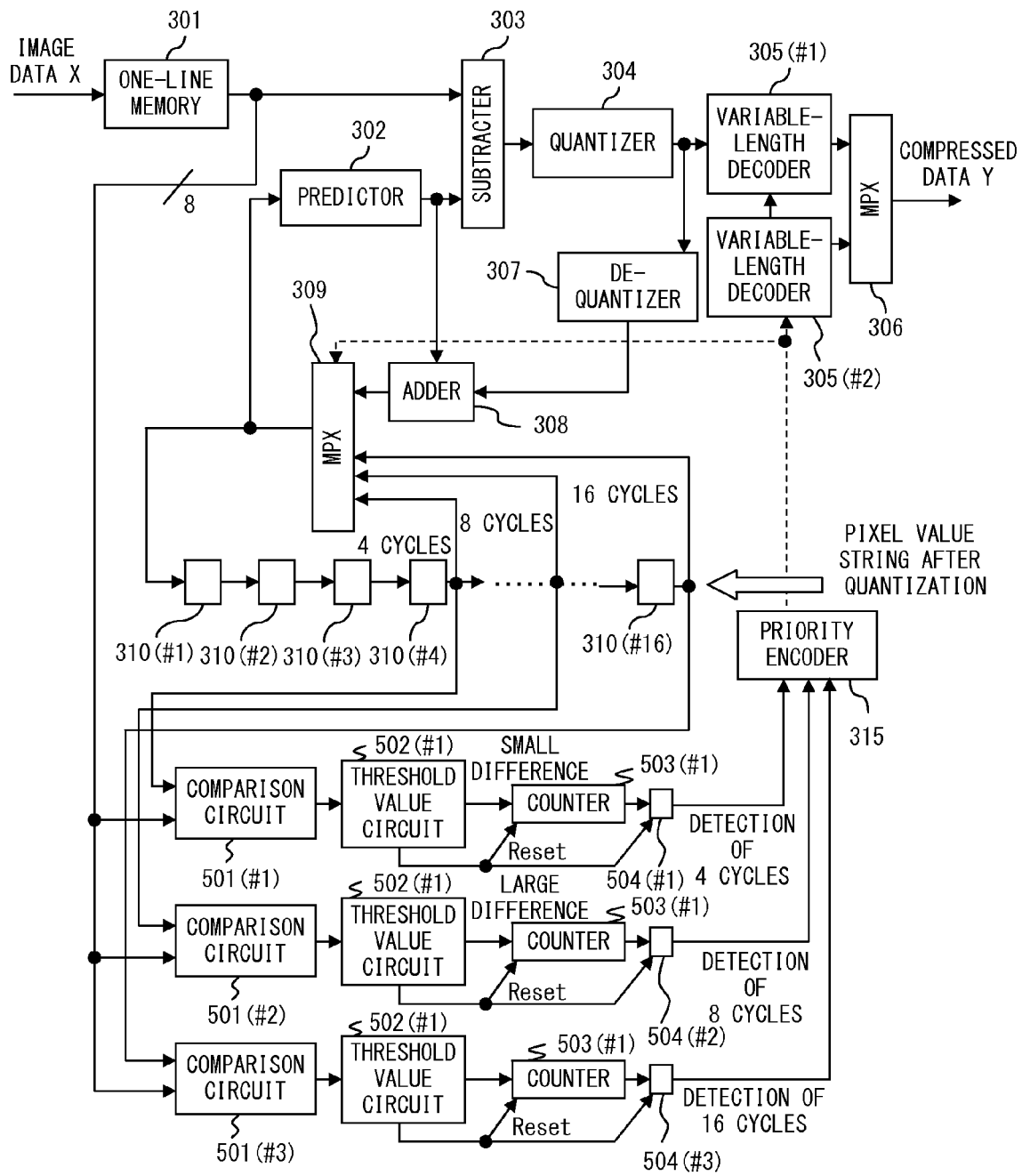
F I G. 5

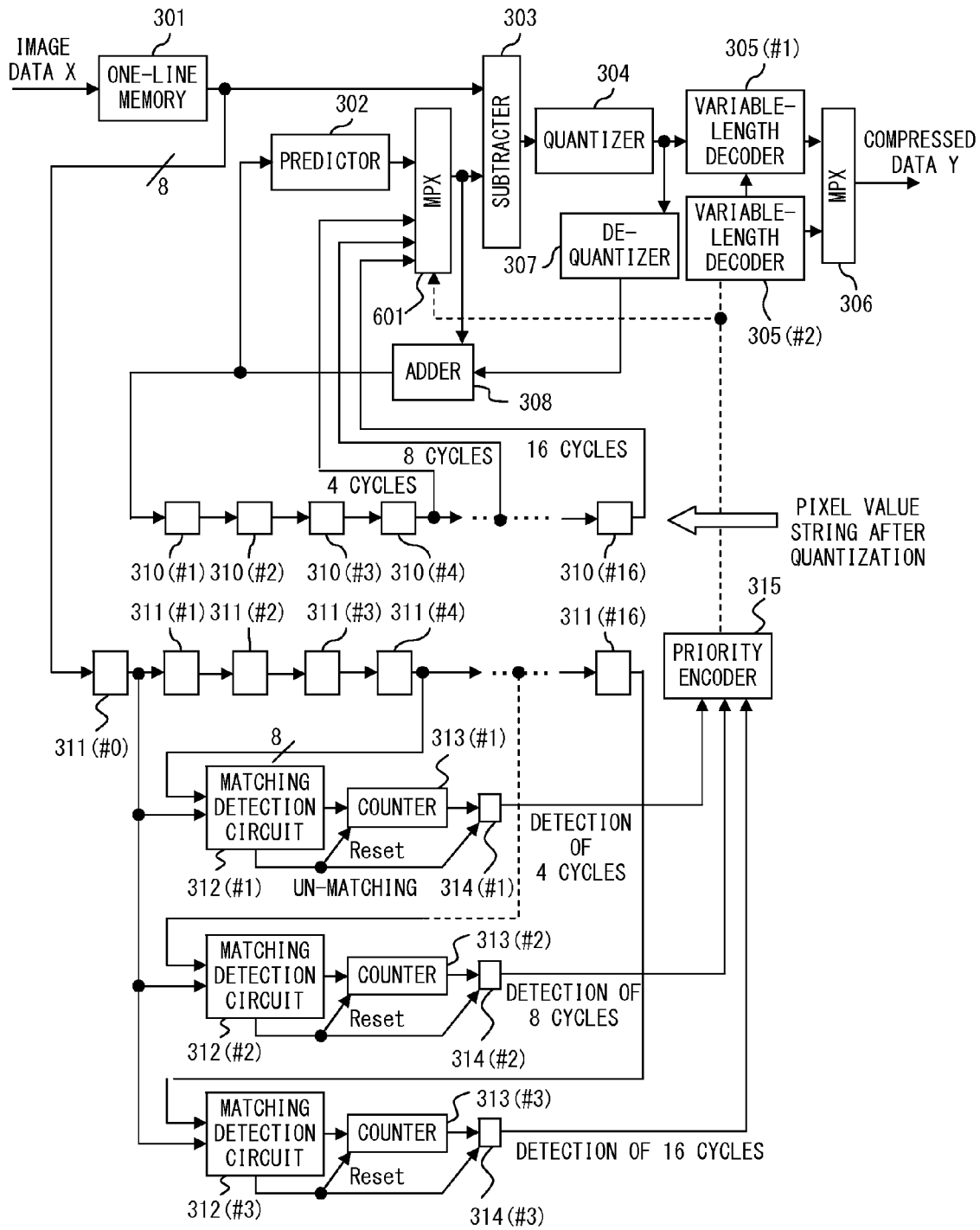
F I G. 6

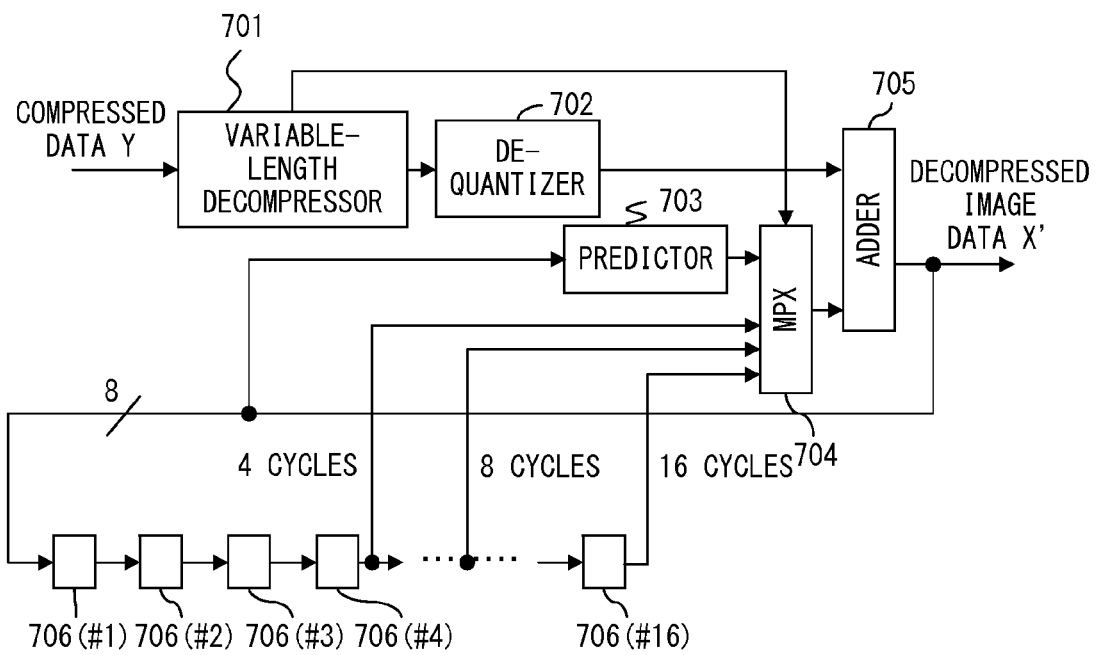
F I G. 7

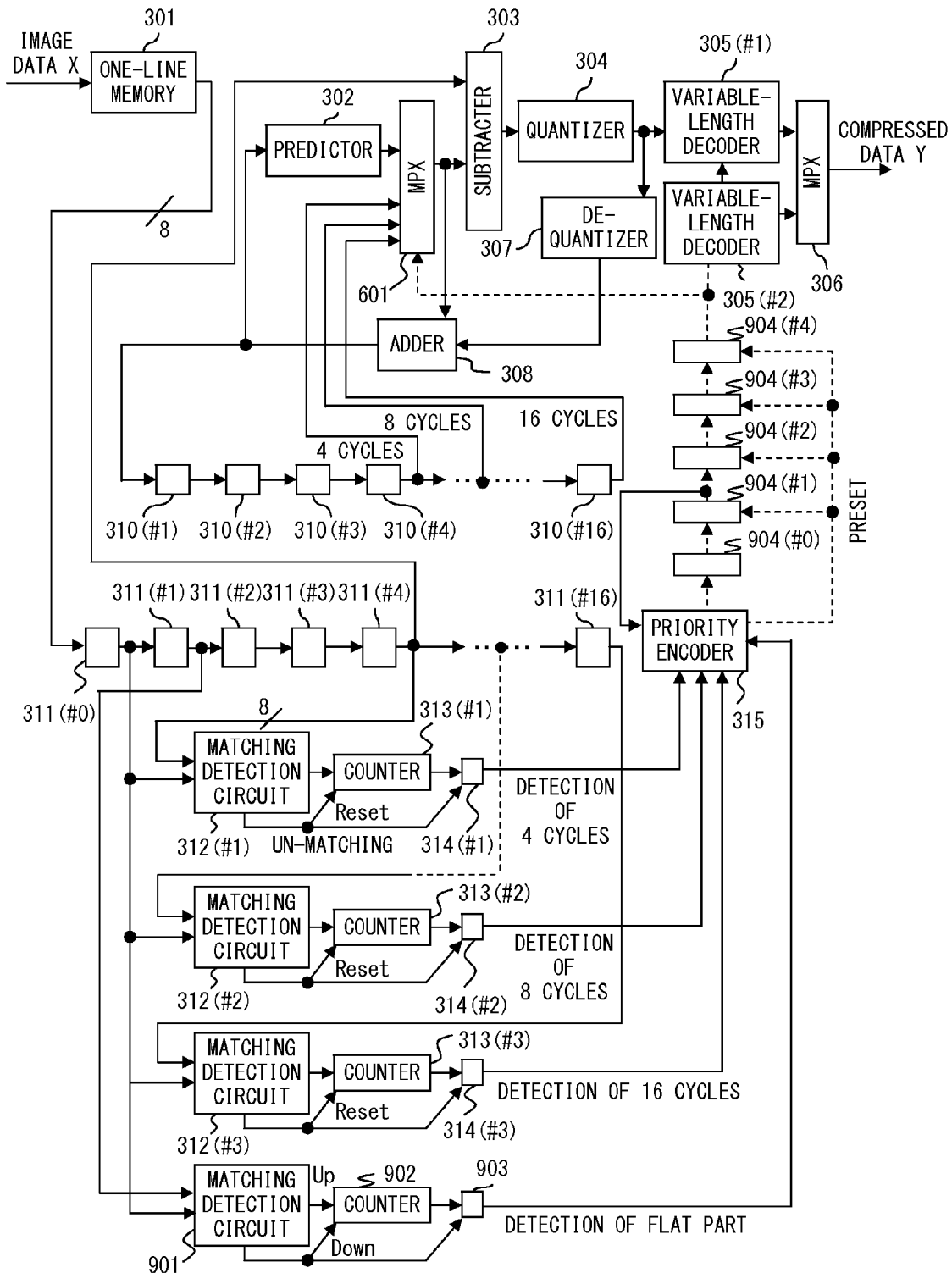
F I G. 9

[EXAMPLE OF QUANTIZER]
IN THE CASE WHERE FRONT-END PREDICTION ERROR $E[i] = X[i] - X[i-1]$'

| SECTION NO. $j$ | 0 | 1 | 2 | 3 | 4 | 5 | 6 | 7 |
|---|---|---|---|---|---|---|---|---|
| $E_j$' | { 2, | 6, | 10, | 15, | 20, | 26, | 35, | 512}; |
| REPRESENTATIVE VALUE $E_j$' | { 0, | 4, | 8, | 12, | 17, | 23, | 30, | 40}; |

QUANTIZATION PREDICTION ERROR $E_i$' = $\text{sign}(E) \cdot Q(|E|)$ at $E_{j-1} < |E| \leq E_j$ QUANTIZATION NO. $k = \begin{cases} 2j & \text{at } E \geq 0 \\ 2j-1 & \text{at } E < 0 \end{cases}$

F I G. 1 2 B

INPUT PIXEL DECOMPRESSION VALUE IN THE CASE WHERE NORMAL FRONT-END PREDICTION QUANTIZATION IS PERFORMED
$X[i]' = X[i-1]' + \text{sign}(E) \cdot Q(|E[i]|)$

| X[i]' | 70 | 74 | 78 | 86 | 63 | 103 | 63 | 103 | 63 | 103 | 63 | 103 | 63 | 103 | 63 | 103 | ... |
|---|---|---|---|---|---|---|---|---|---|---|---|---|---|---|---|---|---|
| E[i] | — | 5 | 5 | 7 | −22 | 66 | −71 | 97 | −39 | 66 | −71 | 97 | −39 | 66 | −71 | 97 | ... |
| E[i]' | — | 4 | 4 | 8 | −23 | 40 | −40 | 40 | −40 | 40 | −40 | 40 | −40 | 40 | −40 | 40 | ... |
| k | — | 2 | 2 | 4 | 9 | 14 | 13 | 14 | 13 | 14 | 13 | 14 | 13 | 14 | 13 | 14 | |

F I G. 1 3 A

INPUT PIXEL DECOMPRESSION VALUE IN THE CASE WHERE A PERIODIC PATTERN IS DETECTED FROM AN ORIGINAL IMAGE AND AN INPUT PIXEL DECOMPRESSION VALUE ONE CYCLE BEFORE IS COPIED AND DECOMPRESSED

| X[i]' | 70 | 74 | 78 | 86 | 63 | 103 | 63 | 103 | 63 | 103 | 63 | 103 | 63 | 103 | ... |
| E[i] | --- | 5 | 5 | 7 | -22 | 66 | -71 | 97 | -39 | 66 | --- | --- | --- | --- | ... |
| E[i]' | --- | 4 | 4 | 8 | -23 | 40 | -40 | 40 | -40 | 40 | 0 | 0 | 0 | 0 | ... |
| k | --- | 2 | 2 | 4 | 9 | 14 | 13 | 14 | 13 | 14 | 0 | 0 | 0 | 0 |  |

← TEXTURE AREA OF FOUR-CYCLE PIXEL---REPETITION CODE ONE CYCLE BEFORE AT THE TIME OF DETECTION

F I G. 1 3 B

| X[i]' | 70 | 74 | 78 | 86 | 63 | 103 | 103 | 63 | 103 | 143 | 63 | 126 | 33 | 160 | 63 | 130 | 33 | 160 |
|---|---|---|---|---|---|---|---|---|---|---|---|---|---|---|---|---|---|---|
| E[i] | — | 5 | 5 | 7 | -22 | 66 | -71 | -39 | 97 | 57 | 1 | 26 | -1 | 17 | 1 | 3 | -1 | 0 |
| E[i]' | — | 4 | 4 | 8 | -23 | 40 | -40 | -40 | 40 | 40 | 0 | 23 | 0 | 17 | 0 | 4 | 0 | 0 |
| k | — | 2 | 2 | 4 | 9 | 14 | 13 | 14 | 14 | 11 | 0 | 10 | 0 | 8 | 0 | 4 | 0 | 0 |

INPUT PIXEL DECOMPRESSION VALUE IN THE CASE WHERE A PERIODIC PATTERN IS DETECTED FROM AN ORIGINAL IMAGE AND IT IS PREDICTED/ENCODED BY A PREDICTION PIXEL VALUE ONE CYCLE BEFORE

TEXTURE AREA OF FOUR-CYCLE PIXEL ONE CYCLE BEFORE AT THE TIME OF DETECTION IS USED FOR A PREDICTION VALUE

F I G. 1 3 C

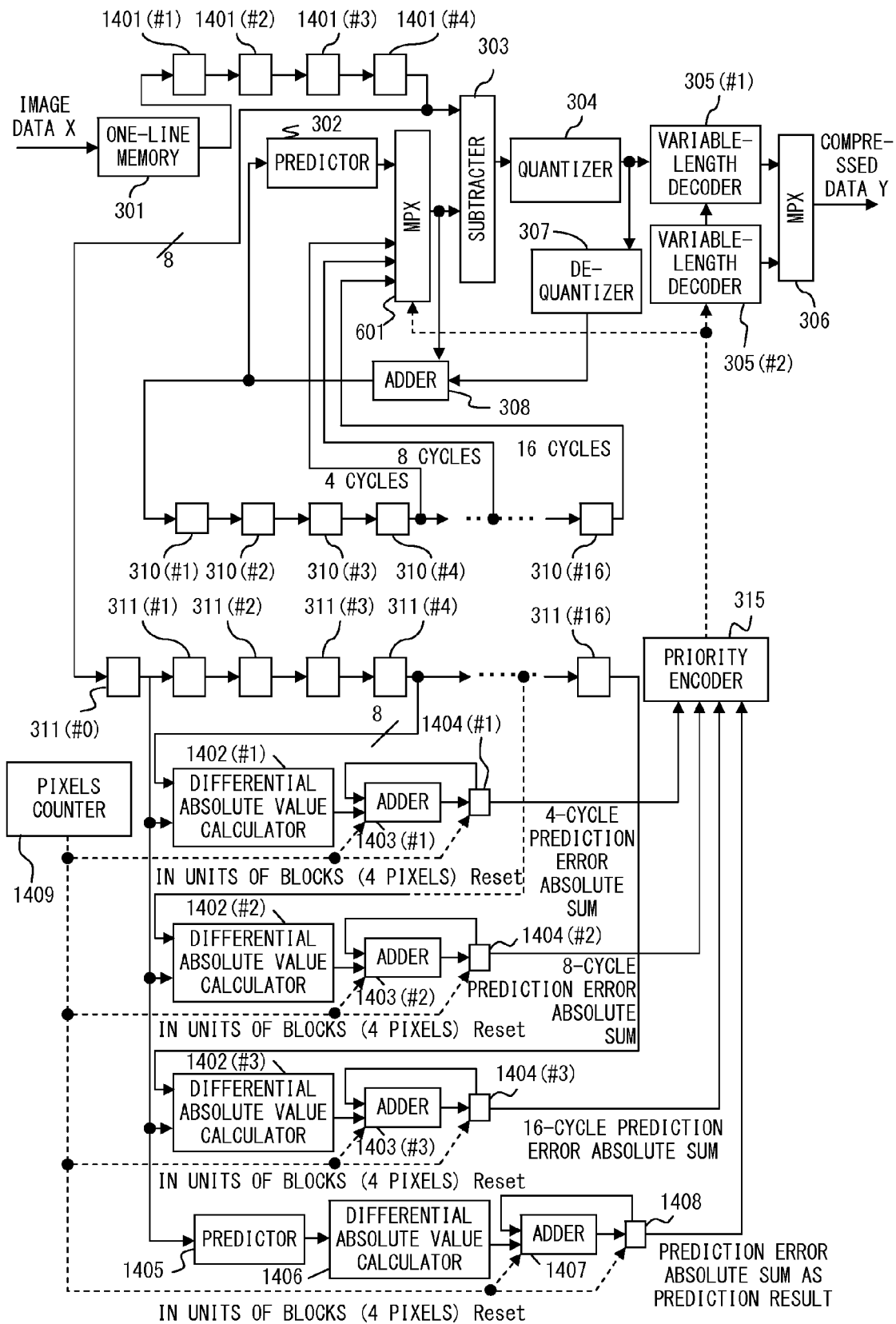
F I G. 14

VIDEO COMPRESSION ENCODING/DECOMPRESSION DEVICE, VIDEO COMPRESSION ENCODING/DECOMPRESSION PROGRAM AND VIDEO GENERATION/OUTPUT DEVICE

CROSS-REFERENCE TO RELATED APPLICATION

This application is a continuation application of International PCT Application No. PCT/JP2007/001135 which was filed on Oct. 18, 2007.

FIELD

The embodiments discussed herein are related to a high-definition and high-efficiency video compression/decompression technique in a video system environment where data transmission capacity is restricted like a vehicle-mounted video system.

BACKGROUND

Recently, in the motor vehicle industry, needs for displaying a monitor video camera image for a driver on a front-seat monitor and also arbitrarily displaying a DVD image and a car navigation image (hereinafter called "navigation image" on both front-seat and back-seat monitors have increased.

In order to arbitrarily display a plurality of video channels on respective front and back monitors, it is necessary to display both a natural image, such as a DVD image and the like and a CG image/line image, such as a navigation image and the like with high definition, using a vehicle-mounted LAN.

Simultaneously, since a LAN mounted on a current vehicle has a video signal transmission capacity for at most only one channel, it is necessary to compress the image data of both a natural image and a CG image with high efficiency/low transmission delay without the degradation of definition.

Furthermore, for a vehicle-mounted system, it is necessary that the circuit scale of a video system is small.

Although there are various standardization methods in video compression, it is difficult to obtain high definition in both a natural image, such as a DVD image and the like and a CG image/line image, such as a navigation image and the like. A video compression method, such as JPEG, MPEG or the like can efficiently display an image having a smooth gradation change. However, in order to clearly display an image having a steep gradation change like an edge, a large amount of codes is necessary, thereby deteriorating video compression efficiency.

Of navigation images, an image having a texture pattern, such as checks, irregular salt and sesame noise in the background is most problematic with respect to definition. Generally, although texture is periodic, it has an irregular shape and is difficult to compress. Therefore, there is a tendency that the amount of codes widely increases. In the case of a transmission path requiring band assurance like a vehicle-mounted LAN, it is necessary to suppress to a specific amount of codes by compressing image data. However, when a large amount of codes are used to display texture, it becomes necessary to increase the data compression ratio in that part. Namely, data compression is increased at the sacrifice of definition. Therefore, it is a problem how an image can be efficiently encoded in a texture area. However, lossy coding in which such loss of image information that cannot be easily sensed by human eyes is allowed is effective in the display of a natural image, such as a DVD image. More particularly, a prediction encoding method for predicting a current pixel using the known values of adjacent pixels, quantizing a prediction error value between the predicted value and the current pixel to make variable-length coding is known as very effective image compression method for displaying a natural image since its circuit scale is small.

However, the prediction coding method predicts a current pixel from several adjacent pixels before and after the current pixel. Therefore, an image having a cycle of several tens of pixels and a steep edge (image area having a steep gradation change) is difficult to predict. As a result, the prediction error value becomes large and a large amount of codes is required to encode such a large prediction error value, which is a problem.

As a method for compressing a periodic image pattern, such as a texture pattern, conventionally a technique for compressing a dot photographic image and a design image is known. A prior art for compressing a periodic image pattern will be explained below.

Non-patent document 1 discloses an application technique of a prediction encoding method. The technique is provided with a plurality of predictors matched with the dot cycle of a reference pixel in a compression method of a dot picture or the standardization method JBIG of a black/white binary image compression for a newspaper image and the like and selects a prediction result having the least prediction error for each specific section. However, since this method has a plurality of predictors, its circuit scale becomes large, which is a problem. Although a dot pattern is a kind of a texture pattern, its size varies. Therefore, the pattern has a character different from the texture pattern in a navigation image and the like. Therefore, this prior art is not always effective in the compression of a texture pattern in a navigation image and the like.

Patent document 1 discloses a universal dictionary type compression method (model LZ77) for detecting a repetitive series that has appeared before and compressing an image by transmitting the matched position and length of the repetition. This method is lossless coding. Its hardware is realized using CAM (content associative memory) and can encodes not only a periodic pattern but also a general image pattern. However, this method has a problem that both its circuit scale and process load are large.

Patent documents 2 and 3 disclose a method for detecting whether the same series as the current one has appeared before and encoding the number M of one cycle and the times of its repetition and a method for detecting whether the same series as the current one has appeared before and encoding its matched off-set position and length, respectively. These methods are lossless coding and are realized by simplifying the LZ77 dictionary type compression method. However, the methods have a problem that they are not suitable for the compression of non-periodic image pattern, such as a natural image.

Any of the prior arts disclosed by Patent documents 1 through 3 is lossless coding, in which as illustrated in FIG. 1, a matching detection circuit 102 detects the matching between a repetitive series that has appeared before and a repetitive series that currently appear while image data is accumulated in the memory 101 for the previous series. Then, a variable-length encoding circuit 103 encodes information about the matching by variable length and outputs compressed codes. As understood from this configuration, any of the above-described prior arts does not adopt a configuration for performing prediction encoding suitable for the compression of a natural image and high-efficiency coding cannot be performed in an environment where a natural image and a navigation image are mixed and a vehicle-mounted LAN cannot be anticipated.

Patent document 4 discloses a compression technique for an image to which a design is applied. However, this method also has a problem that it is not suitable for the compression of a non-periodic image pattern, such as a natural image.

The following documents are publicly known examples that are referenced in the specification of the present invention.

Non-patent document 1: "Data Compression of Newspaper Pages Using Adaptive Prediction" (Technical Report of The Institute of Electronics, Information and Communication Engineers IE78-55)

Patent document 1: Japanese Patent No. 2713369

Patent document 2: Japanese Laid-open Patent Publication No. 2003-264703

Patent document 3: Japanese Laid-open Patent Publication No. 11-168389

Patent document 4: Japanese Laid-open Patent Publication No. 2003-174564

SUMMARY

According to the first aspect of the invention, a video compression encoding device and a video decoding device have the following configurations.

According to the first aspect of the invention, a video compression encoding device includes a prediction unit for calculating a prediction pixel value for predicting a current input pixel value on the basis of image data, a prediction error calculation unit for calculating a prediction error value between the current input pixel value and the prediction error value inputted via a selection unit (for example, a subtractor), a quantization unit for quantizing the prediction error value and calculating a prediction error quantization value (for example, a non-linear quantizer), a prediction error encoding unit for encoding the prediction error quantization value and outputting the value as compression data (for example, a variable-length encoder) and a decomposition unit for decompressing a decompression pixel value on the decompression side on the basis of the prediction error quantization value and the prediction pixel value and giving the value to the prediction unit (for example, a non-linear de-quantizer and an adder). The device compresses/encodes image data by prediction encoding and outputs compressed data.

According to the first aspect of the invention, a video compression encoding device further includes the following units, presuming the above configuration.

A previous decompression pixel value storage unit is, for example, a shift register and stores decompression pixel values outputted from the decompression unit, for a predetermined number of pixels immediately before a focus pixel.

A periodic pattern area detection unit detects a periodic pattern area included in image data, where a pixel value is regularly repeated in the scanning direction.

When the periodic pattern area is detected, a periodic pattern encoding unit encodes information about the periodic pattern and outputs the information as part of compressed data. Simultaneously, the unit stops the output of the prediction error encoding unit.

When the periodic pattern area is detected, a selection unit reads a decompression pixel value before a cycle corresponding to the periodic pattern from the previous decompression pixel value storage unit and gives the value to the prediction unit instead of the decompression pixel value outputted from the decompression unit. Simultaneously, the unit re-stores the value in the previous decompression pixel value storage unit.

Next, according to the first aspect of the invention, a video decompression device includes a prediction error decompression unit for decompressing a prediction error decompression value from the compressed data that is transmitted from the video compression encoding unit and is received, for example, via a vehicle-mounted LAN or the like, a prediction unit for calculating a prediction pixel value for predicting the current decompression pixel value and a decompression pixel value calculation unit for calculating a prediction pixel value on the basis of both the prediction pixel value and the prediction error decompression value, outputting the value as image data and also giving the value to the prediction unit. The unit decompresses image data from the data compressed/encoded by prediction encoding.

According to the first aspect of the invention, a video decompression device further includes the following units, presuming the above configuration.

A previous decompression pixel value storage unit is, for example, a shift register and stores decompression pixel values outputted from the decompression unit, for a predetermined number of pixels immediately before a focus pixel.

A periodic pattern decompression unit decompresses information about a periodic pattern included in an input pixel value from the compressed data.

When the information about a periodic pattern is detected, a selection unit reads a decompression pixel value before a cycle corresponding to the periodic pattern from the previous decompression pixel value storage unit and outputs the value instead of the decompression pixel value outputted from the decompression pixel value calculation unit as image data. Simultaneously, the unit re-stores the value in the previous decompression pixel value storage unit and gives the value to the prediction unit.

By the above configurations of a video compression encoding device and video decompression device according to the first aspect of the invention, firstly, on the video compression encoding device side, if image data includes no periodic pastern, the prediction error encoding unit outputs the variable-length code of a prediction error quantization value generated by prediction encoding as compressed data. If image data includes a periodic pastern, the periodic pattern encoding unit outputs only information about the periodic pattern as compressed data and the output of the prediction error encoding unit is stopped.

However, on the video decompression device side, while no periodic pattern is included in the compressed data, the normal decompression process of prediction encoding is performed. Then, when detecting the information about a periodic pattern, the periodic pattern decompression unit copies the decompression pixel value of a specified cycle width one cycle before, stored in the previous decompression pixel value storage unit as a current decompression pixel value and outputs the value as image data that is selected by the selection unit and is decompressed.

Thus, while a texture-like a periodic pattern is included in image data, compressed data can be expressed by only a code for instructing the copying of the periodic pattern having a specified cycle. Thus, the amount of data of variable-length encoded string in the section can be widely compressed. Thus, the amount of packet data transmitted to a transmission path can be widely compressed.

While no periodic pattern is included in image data, efficiently compressed data can be generated by normal prediction encoding.

Next, according to the second aspect of the invention, a video compression encoding device and a video decoding device have the following configurations.

Firstly, according to the second aspect of the invention, a video compression encoding device includes a prediction unit, a prediction error calculation unit, a quantization unit, a prediction error encoding unit and a decompression unit like a video compression encoding device according to the first aspect of the invention.

According to the second aspect of the invention, a video compression encoding device further includes the following configurations, presuming this configuration.

Firstly, the video compression encoding device includes a previous decompression pixel value storage unit, a periodic pattern area detection unit and a periodic pattern encoding unit like the video compression encoding device in the first aspect of the invention.

When a periodic pattern area is detected, a selection unit reads a decompression pixel value before a cycle corresponding to a periodic pattern from the previous decompression pixel value storage unit and gives the value to the prediction error calculation unit instead of a prediction pixel value outputted from the prediction unit.

Next, according to the second aspect of the invention, a video decompression device includes a prediction error decompression unit, a prediction unit and a decompression pixel value calculation unit like the video decompression device according to the first aspect of the invention.

According to the second aspect of the invention, a video decompression device further includes the following units, presuming the above configuration.

Firstly, the video decompression device includes a previous decompression pixel value storage unit and a periodic pattern decompression unit like the video decompression device according to the first aspect of the invention.

Then, when information about a periodic pattern is detected, a selection unit reads a decompression pixel value before a cycle corresponding to a periodic pattern from the previous decompression pixel value storage unit and gives the value to the prediction error calculation unit instead of a prediction pixel value outputted from the prediction unit.

In the earlier-described configuration of the video compression encoding device according to the first aspect of the invention, when image data includes a periodic pattern, no output of the quantization unit of the video compression encoding device is outputted and only information about a periodic pattern indicated in the copy instruction of a decompression pixel value before one cycle is outputted as compressed data.

However, the video compression encoding device according to the second aspect of the invention, when image data includes a periodic pattern, a decompression pixel value before one cycle, stored in the previous decompression pixel value storage unit is supplied to the prediction error calculation unit as a new prediction pixel value via the selection unit and a prediction operation is performed on the basis of the value. The prediction error value obtained as a result is quantized into a prediction error quantization value by a quantizer and is encoded by the prediction error encoding unit. Then, the value is outputted as compressed data.

By such a configuration, even when a texture-like periodic pattern is included in image data, high-accuracy prediction encoding can become possible and a high compression ratio can be secured without deterioration of definition.

However, in the video decompression device according to the second aspect of the invention, while a periodic pattern is included in image data, by the periodic pattern decompression unit detecting information about the periodic pattern and controlling the selection unit, a decompression pixel value is calculated on the basis of the decompression pixel value one cycle before, stored in the previous decompression pixel value storage unit and the prediction error decompression value that is outputted from the prediction decompression unit and is predicted/encoded with high accuracy. Thus, image data can be decompressed.

In the above-described configuration of the video decompression device according to the first and second aspects of the invention, the periodic pattern area detection unit in the video decompression device can include, for example, a previous input pixel value storage unit, such as a shift register for storing the input pixel value of a pixel immediately before a focus pixel, by a predetermined number of pixels, a cycle detection unit for detecting that the current input pixel value and the input pixel value stored in the previous input pixel value storage unit, which is apart from the current input pixel value by the number of pixels corresponding to a predetermined cycle, of each of predetermined cycles, are consecutively matched predetermined times and an encoder unit for selecting the output of one having the longest cycle, of respective cycle detection units and outputting it as a signal indicating that the periodic pattern area of the cycle is detected.

Alternatively, the periodic pattern area detection unit can include a cycle detection circuit for detecting that the difference between the current input pixel value and the decompression pixel value stored in the previous decompression pixel value storage unit, which is apart from the current input pixel value by the number of pixels corresponding to a predetermined cycle, of each of predetermined cycles is consecutively equal to or less than a predetermined threshold value predetermined times and an encoder circuit for selecting the output corresponding to the longest cycle of each determination unit and outputting it as a signal indicating that the periodic pattern area of the cycle is detected.

The periodic pattern area detection unit can also detect a flat area by whether the latest times of matching between the current process pixel value and a pixel value immediately before it, of an input pixel value or a decompression pixel value exceed a predetermined value or not and exclude the area from the detected area as a periodic pattern area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 3 is a circuit configuration of a compression encoding device in the first preferred embodiment of the present invention.

FIG. 4 is a circuit configuration of a decompression device in the first and second preferred embodiments of the present invention.

FIG. 5 is a circuit configuration of a compression encoding device in the second preferred embodiments of the present invention.

FIG. 6 is a circuit configuration of a decompression device in the third preferred embodiments of the present invention.

FIG. 7 is a circuit configuration of a decompression device in the third, fourth fifth and sixth preferred embodiments of the present invention.

FIG. 9 is a circuit configuration of a compression encoding device in the fifth preferred embodiments of the present invention.

FIG. 12B explains the encoding operation in each preferred embodiment of the present invention (No. 1-2).

FIG. 13A explains the encoding operation in each preferred embodiment of the present invention (No. 2-1).

FIG. 13B explains the encoding operation in each preferred embodiment of the present invention No. 2-2).

FIG. 13C explains the encoding operation in each preferred embodiment of the present invention (No. 2-3).

FIG. 14 is a circuit configuration of a compression encoding device in the sixth preferred embodiments of the present invention.

DESCRIPTION OF EMBODIMENTS

Preferred embodiments of the present invention will be explained below with reference to accompanying drawings.

Principle of the Present Invention

FIGS. 2A, 2B, 2C and 2D are the basic block diagrams of the present invention.

Figure 1:
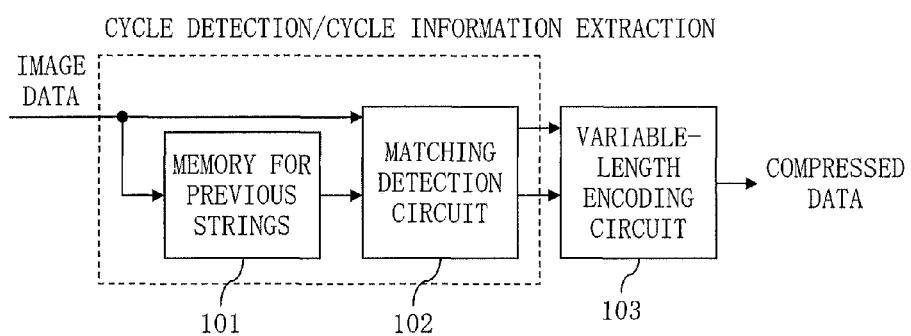
FIG. 1 illustrates the concept of the prior art.
Figure 2A:
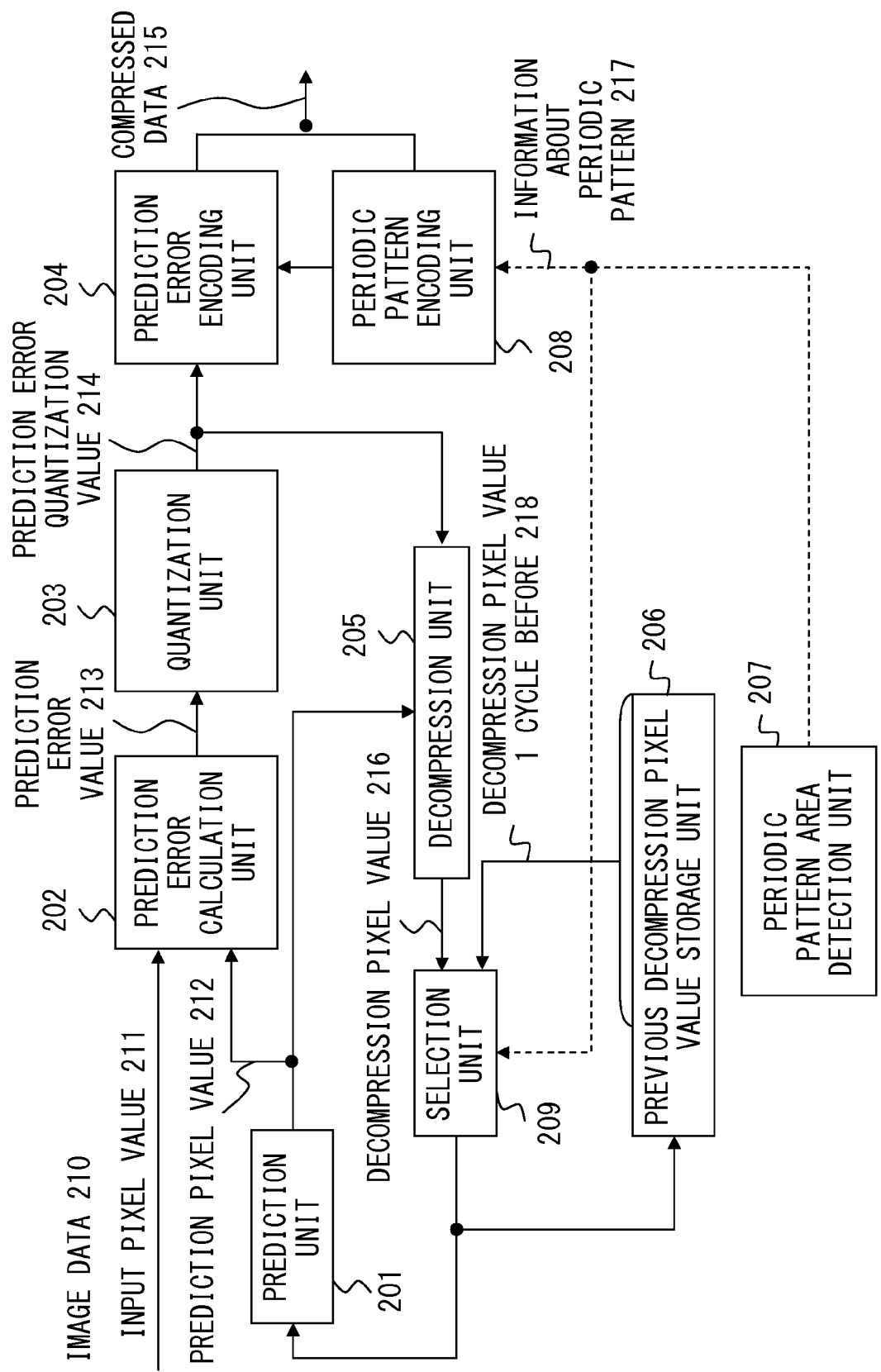
FIG. 2A is a basic block diagram of the present invention No. 1).
Figure 2B:
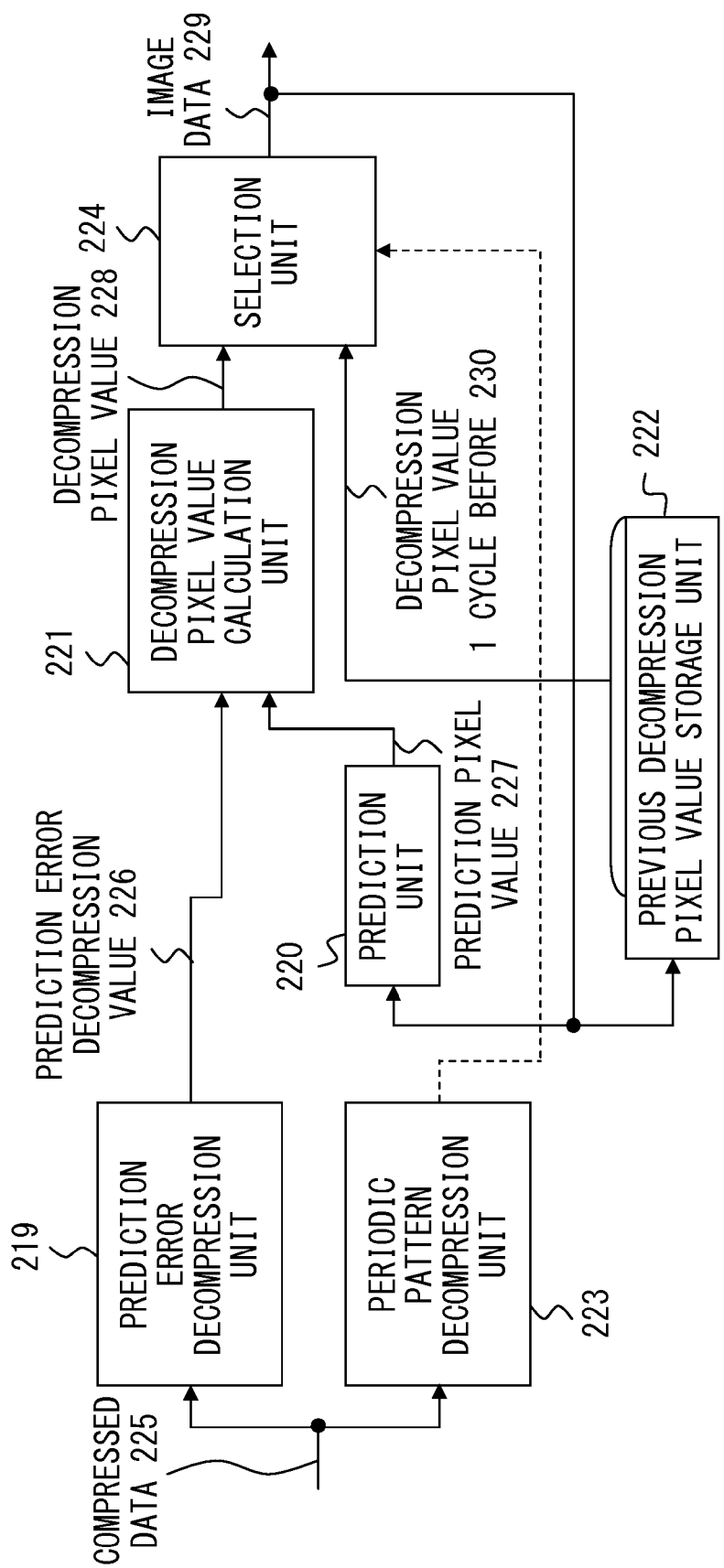
FIG. 2B is a basic block diagram of the present invention No. 2).

Firstly, FIGS. 2A and 2B are a pair of the basic block diagrams of a compression encoding device and a decompression device in the first preferred embodiment of the present invention.

Firstly, the video compression encoding device illustrated in FIG. 2A includes a prediction unit 201 for calculating a prediction pixel value 212 for predicting the current input pixel value 211 in image data 210, a prediction error calculation unit 202 for calculating a prediction error value 213 between the current input pixel value 211 and a prediction pixel value 212 inputted via a selection unit 209 (for example, a subtractor), a quantization unit 203 for quantizing the prediction error value 213 to calculate a prediction error quantization value 214 (for example, a non-linear quantizer), a prediction error encoding unit 204 for encoding the prediction error quantization value 214 and outputting the value as compressed data 215 (for example, a variable-length encoder) and a decompression unit 205 for decompressing a decompression pixel value 216 from the prediction error quantization value 214 and the prediction pixel value 212 on the decompression side and giving the value to the prediction unit 201 (for example, a non-linear de-quantizer and an adder). The device compresses/encodes image data by prediction encoding and outputs compressed data 215.

Presuming the above configuration, the video compression encoding device illustrated in FIG. 2A further includes the following units.

A previous decompression pixel value storage unit 206 is, for example, a shift register and stores decompression pixel values outputted from the decompression unit, for a predetermined number of pixels immediately before a focus pixel.

A periodic pattern area detection unit 207 detects a periodic pattern area included image data, where a pixel value is regularly repeated in the scanning direction.

When the periodic pattern area is detected, a periodic pattern encoding unit 208 encodes information 217 about the periodic pattern and outputs the information 217 as part of compressed data. Simultaneously, the unit 208 stops the output of the prediction error encoding unit 204.

When the periodic pattern area is detected, a selection unit 209 reads a decompression pixel value 218 one cycle before corresponding to the periodic pattern from the previous decompression pixel value storage unit 206 and gives the value 218 to the prediction unit 201 instead of the decompression pixel value 216 outputted from the decompression unit 205. Simultaneously, the unit 209 re-stores the value 218 in the previous decompression pixel value storage unit 206.

The video decompression device illustrated in FIG. 2B includes a prediction error decompression unit 219 for decompressing a prediction error decompression value 226 from compressed data 225 that is transmitted from the video compression encoding device illustrated in FIG. 2A and is received via, for example, a vehicle-mounted LAN or the like, a prediction unit 220 for calculating a prediction pixel value 227 for predicting the current decompression pixel value 228 and a decompression pixel value calculation unit 221 for calculating a decompression pixel value 228 on the basis of the prediction pixel value 227 and the prediction error decompression value 226, outputting the value 228 as image data 229 and also giving the value 228 to the prediction unit 220. The device decompresses the image data 229 from the data 225 compressed/encoded by prediction encoding.

Presuming the above configuration, the video decompression device illustrated in FIG. 2B further includes the following units.

A previous decompression pixel value storage unit 222 is, for example, a shift register and stores decompression pixel values 228 outputted from the decompression pixel calculation unit 221, for a predetermined number of pixels immediately before a focus pixel.

A periodic pattern decompression unit 223 decompresses information about a periodic pattern included in an input pixel value from the compressed data 225.

When the information about a periodic pattern is detected, a selection unit 224 reads a decompression pixel value 230 one cycle before corresponding to the periodic pattern from the previous decompression pixel value storage unit 222 and outputs the value 230 instead of the decompression pixel value 228 outputted from the decompression pixel value calculation unit 221 as image data 229. Simultaneously, the unit 224 re-stores the value 230 in the previous decompression pixel value storage unit 222 and gives the value 230 to the prediction unit 220.

By the configurations of the video compression encoding device illustrated in FIG. 2A and the video decompression device illustrated in FIG. 2B, when image data 210 is not included in a periodic pattern, the prediction error encoding unit 204 outputs the variable-length code of the prediction error quantization value 214 generated by prediction encoding as the compressed data 215. When image data 210 is included in a periodic pattern, the periodic pattern encoding unit 208 outputs only information about the periodic pattern as the compressed data 215 and stops the output of the prediction error encoding unit 204.

However, in the video decompression device illustrated in FIG. 2B, while a periodic pattern is not included in the compressed data 225 (=215 in FIG. 2A), a normal decompression process against prediction encoding is performed. Then, when detecting information about the periodic pattern, the periodic pattern decompression unit 223 copies the decompression pixel value 230 one cycle before having a specified cycle width, stored in the previous decompression pixel storage unit 222 as the current decompression pixel value and outputs the value as the image data 229 that is selected by the selection unit 224 and is decompressed.

Thus, while a texture-like periodic pattern is included in image data, the compression data 215/225 can be expressed by only a code for instructing the copying of a periodic pattern having a specific cycle. Thus, the amount of data of variable-length encoded string in the section can be widely compressed. Thus, the amount of packet data transmitted to a vehicle-mounted LAN can be widely compressed.

While a periodic pattern is not included in image data, the compression data 215/225 can be efficiently generated by normal prediction encoding.

Figure 2C:
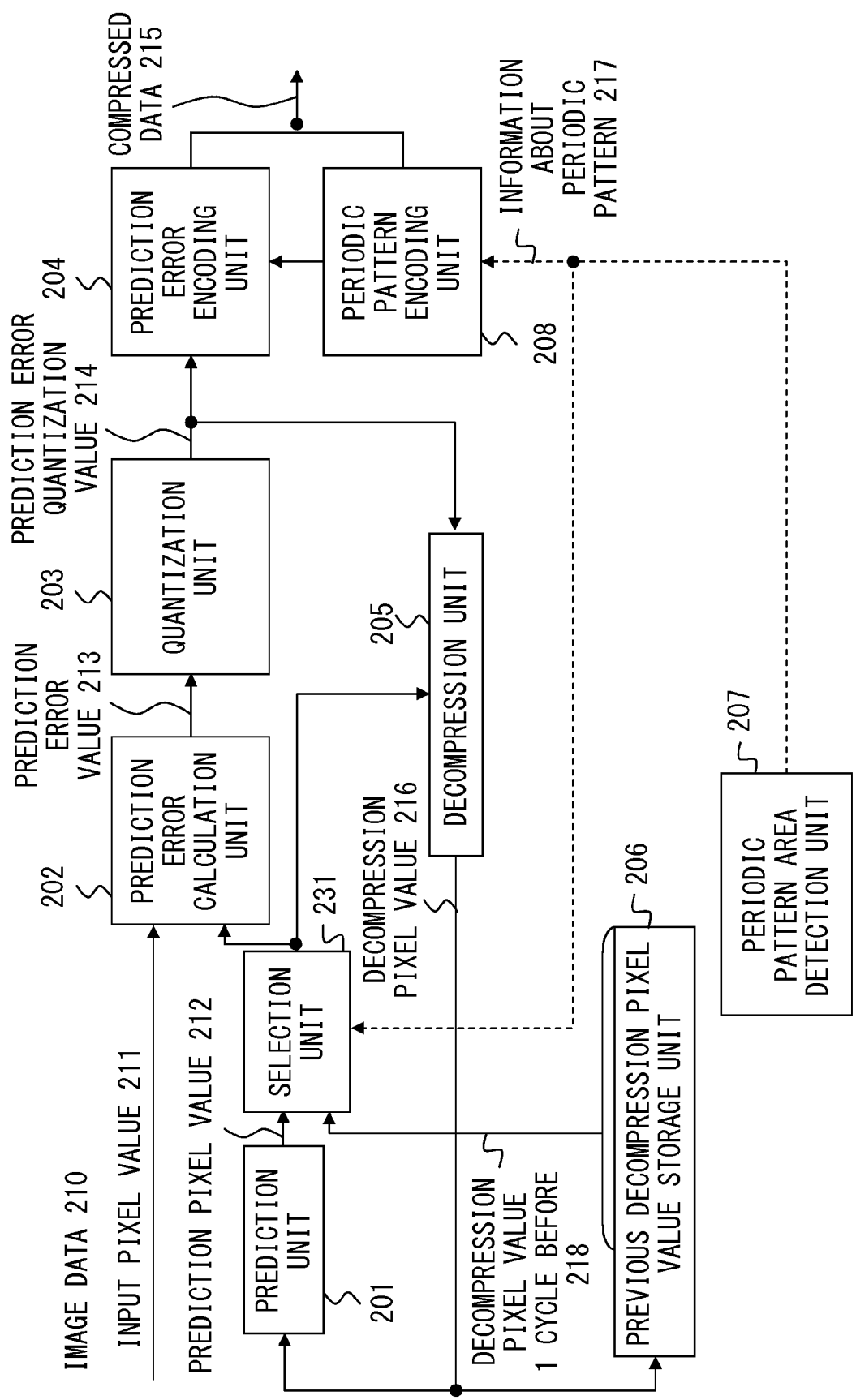
FIG. 2C is a basic block diagram of the present invention No. 3).
Figure 2D:
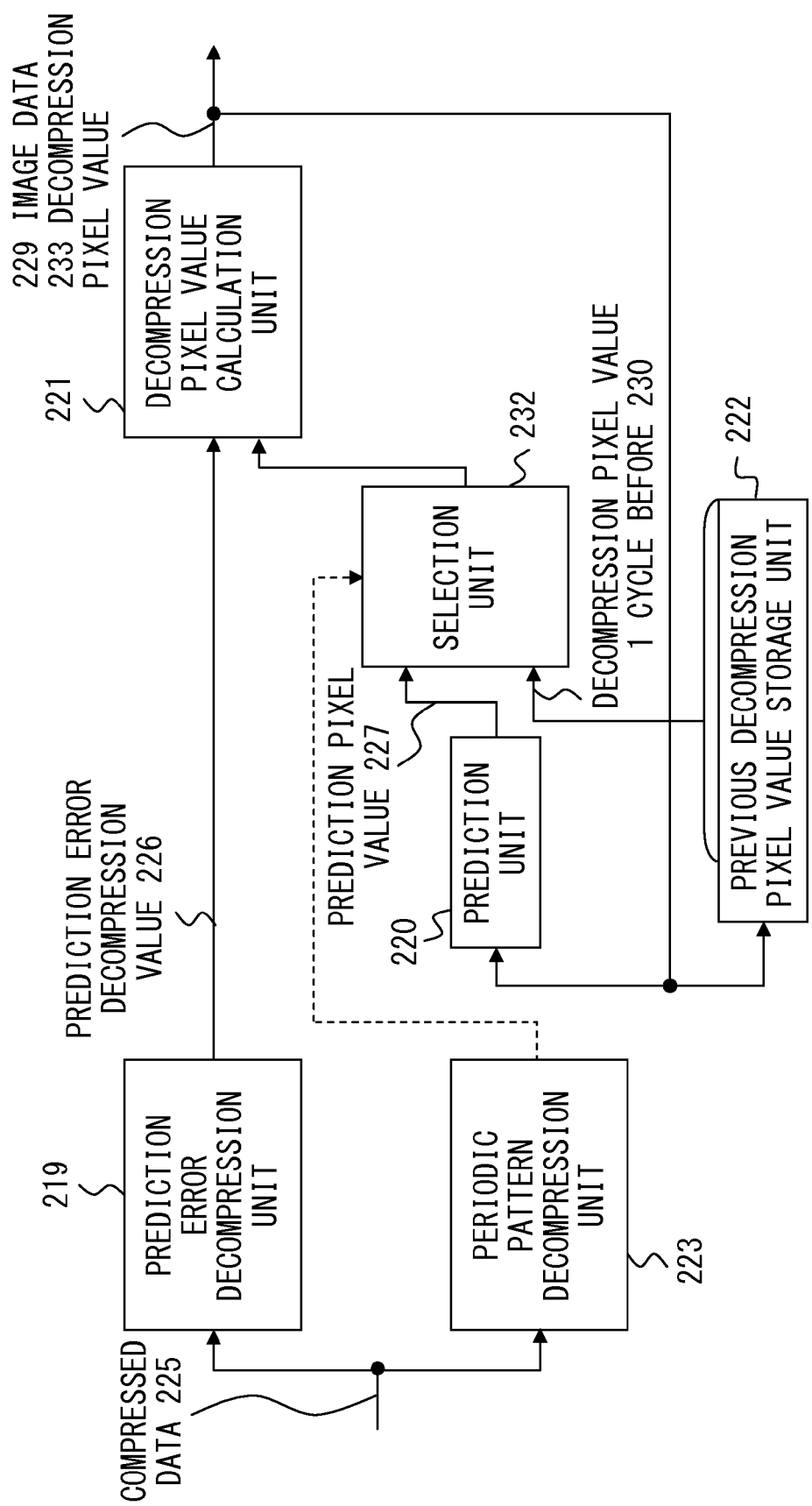
FIG. 2D is a basic block diagram of the present invention No. 4).

Next, FIGS. 2C and 2D are a pair of the basic block diagrams of the video compressed encoding device and the video decompression device in the second preferred embodiment of the present invention.

Firstly, the video compressed encoding device illustrated in FIG. 2C includes a prediction unit 201, a prediction error calculation unit 202, a quantization unit 203, a prediction error encoding unit 204 and the decompression unit 205 like the video compressed encoding device illustrated in FIG. 2A.

Presuming the above configuration, the video compressed encoding device illustrated in FIG. 2C further includes the following units.

Firstly, the video compressed encoding device includes a previous decompression pixel value storage unit 206, a periodic pattern area detection unit 207 and a periodic pattern encoding unit 208.

Then, when a periodic pattern area is detected, a selection unit 231 reads a decompression pixel value 218 one cycle before corresponding to a periodic pattern from the previous decompression pixel value storage unit 206 and gives the value 218 to the prediction error calculation unit 220 instead of the prediction pixel value 212 outputted from the prediction unit 201.

Next, the video decompression device illustrated in FIG. 2D includes a previous decompression pixel value storage unit 222 and a periodic pattern decompression unit 223 like the video decompression device illustrated in FIG. 2B.

Then, when information about a periodic pattern is detected, a selection unit 232 reads a decompression pixel value 230 one cycle before corresponding to a periodic pattern from the previous decompression pixel value storage unit 222 and gives the value 230 to the prediction error calculation unit 221 instead of the prediction pixel value 227 outputted from the prediction unit 220.

In the earlier-described configuration illustrated in FIG. 2A, when a periodic pattern is included in the image data 210, the decompression pixel value 218 one cycle before, stored in the previous decompression pixel value storage unit 206 is supplied to the prediction error calculation unit 202 as a new prediction pixel value via the selection unit 231 and an pre-diction operation is performed on the basis of the value. The prediction error value 213 obtained by this is quantized into a prediction error quantization value 214 by the quantizer 203 and is outputted as compressed data 215 after encoded by the prediction error encoding unit 204.

By such a configuration, even when the image data 210 includes a texture-like periodic pattern, high-accuracy prediction encoding can be executed and a high compression ratio can be secured without the deterioration of definition.

However, in the video decompression device illustrated in FIG. 2D, even while a periodic pattern is included in image data, by the periodic pattern decompression unit 223 detecting information about the periodic pattern and controlling the selection unit 232, a decompression pixel value 233 can be calculated on the basis of the decompression pixel value 230 one cycle before, stored in the previous decompression pixel value storage unit 222 and a prediction error decompression value that is outputted from the prediction error decompression unit 219 and is predicted/encoded with high accuracy. Thus, image data 229 can be decompressed.

In the above-described configuration, the periodic pattern area detection unit 207 illustrated in FIG. 2A or 2C can include, for example, a previous input pixel value storage unit, such as a shift register for storing the input pixel value 211 by a predetermined number of pixels of a pixel immediately before a focus pixel, a cycle detection unit for detecting that a current input pixel value 211 and an input pixel value 211 stored in the previous input pixel value storage unit, apart from the current input pixel value 211 by a number of pixels corresponding to a predetermined cycle are consecutively matched predetermined times and an encoder unit for selecting the output of one having the longest cycle, of respective cycle detection units and outputting it as a signal indicating that the periodic pattern area of the cycle is detected.

Alternatively, the periodic pattern area detection unit 207 can include a cycle detection circuit for detecting that the difference between the current input pixel value 211 and the decompression pixel value 216 stored in the previous decompression pixel value storage unit 206, apart from the current input pixel value by the number of pixels corresponding to a predetermined cycle, of each of predetermined cycles is consecutively equal to or less than a predetermined threshold value predetermined times and an encoder circuit for selecting the output of one having the longest cycle, of respective determination units and outputting it as a signal indicating that the periodic pattern area of the cycle is detected.

The periodic pattern area detection unit 207 can also detect a flat area by determining whether the latest times of matching between the current process pixel value and a pixel value immediately before it, of the input pixel value 211 or the decompression pixel value 216 exceed a predetermined value or not and exclude the area from the detected area as a periodic pattern area.

First Embodiment

FIGS. 3 and 4 are the configurations of the first preferred embodiment of the present invention. FIG. 3 is the circuit configuration of a video compression encoding device. FIG. 4 is the circuit configuration of a video decompression device.

This preferred embodiment has a function to detect a periodic pattern from the pixel value string of the original image of image data X. When a periodic pattern is detected, compressed data Y encoded to instruct to copy a pixel value one cycle before and output it, is outputted. However, on the decompression side, while the copying instruction of the pixel value one cycle before is not detected from the compressed data Y, a decompression operation by normal prediction coding is performed. However, when the above-described instruction is detected, the pixel value one cycle before, stored inside is copied and outputted.

The video compression encoding device illustrated in FIG. 3 of this preferred embodiment can detect the respective texture-like periodic patterns of four, eight and 16 pixels included in a navigation image or the like. Naturally, another periodic pattern can also be detected taking into consideration the characteristic of a navigation image to be processed or the like.

Firstly, the video compression encoding device in the first preferred embodiment of the present invention illustrated in FIG. 3 will be explained.

As to image data X, eight-bit data for one line in the scanning direction is stored in one-line memory 301.

A prediction error value is calculated by a subtractor 303 by subtracting a prediction pixel value outputted from the predictor 302 from the respective eight-bit pixel value of the image data X outputted from the one-line memory 301.

The prediction error value is non-linearly quantized into, for example, a prediction error quantization value by the quantizer 304. The value is further converted to a variable-length code, such as a Huffman code or the like by a variable encoder 305 (#1) and is outputted as compressed data Y via a multiplexer (MPX) 306. This piece of compressed data Y is formed into a packet via a network interface circuit or the like, which is not illustrated in FIG. 3, and is outputted to a vehicle-mounted LAN.

Then, the output of the quantizer 304 is de-quantized by a de-quantizer 307 having its reverse characteristic and as a result, the decompressed value on the decompression circuit side of the prediction error value is reproduced. The decompression value on the decompression circuit side of the input pixel value prediction error decompressed value is reproduced as a decompression pixel value by an adder 308 adding the prediction error decompression value to the prediction pixel value outputted from the predictor 302.

This decompression pixel value is fed back to the predictor 302 via an MPX 309.

The above-described predictor 302, subtractor 303, quantizer 304, variable-length encoder 305, de-quantizer 307 and adder 308 constitute a prediction encoding system.

Figure 10:
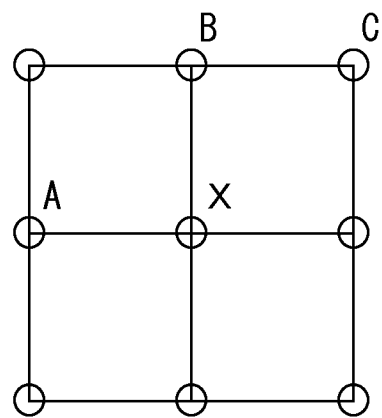
FIG. 10 explains a prediction operation in prediction encoding.

As a prediction method realized by the predictor 302, the following method for outputting a one-dimensional front-end prediction in a frame, that is, a decompression pixel value A one pixel before as it is as a current prediction pixel value X' for the current pixel value X, as illustrated in FIG. 10, $X'=A$ the following method for outputting a two-dimensional linear prediction in a frame, that is, the linear sum of decompression pixel values A, B, C and the like one pixel before and one line before for the current pixel value X, as illustrated in FIG. 10, $$X'=A/2+B/4+C/4$$

or the like can be adopted. Besides, various generally-known prediction methods can also be adopted. In the two-dimensional prediction, the predictor 302 stores a decompression pixel value one line before in its inside.

In this preferred embodiment, image data X is, for example, a natural image by DVD and the like. When no periodic pattern of texture or the like is included in it, by making the output of a priority encoder 315, for example, all bit 0, the MPX 309 selects a decompression pixel value outputted from the adder 308 and inputs it to the predictor 302. As a result, this preferred embodiment operates as a normal prediction encoding device.

Then, 17 shift registers 311 #0-#16 each having 8-bit width store the current 8-bit pixel value (image data) outputted from the one-line memory 301 and respective 8-bit pixel values from before the current pixel by one pixel to before the current pixel by 16 pixels in the line direction while sequentially shifting them every piece of pixel timing.

A matching detection circuit 312 (#1) determines whether the current input pixel value outputted from the shift register 311 (0#) coincides with the input pixel value four pixels before (four pixels from the left in the line direction) outputted from the shift register 311 (#4). This circuit includes, for example, eight exclusive OR (exclusive logical sum) circuits to each of which the respective bits of each pixel value composed of eight bits are inputted, one AND circuit to which the output of those eight exclusive OR circuits is inputted and two latch circuits each of which latches both the output and an output obtained by inverting the logic of the output. One of the latch circuits outputs a logical value for incrementing a value indicated by a counter 313 (#1) and the other latch circuit outputs a logical value for resetting the counter 313 (#1) and the latch 314 (#1). When the outputs of the matching detection circuit 312 (#1) are matched, the counter 313 (#1) increments its counter value. When the outputs are not matched, the counter 313 resets the counter value. Then, when the counter value reaches, for example, eight, the counter 313 (#1) outputs one overflow value indicating the detection of four periodic patterns to the latch 314 (#1).

When the matching detection circuit 312 (#1) detects their un-matching, the storage contents of the latch 314 (#1) is reset and until then stores the value outputted from the counter 313 (#1).

When the image data X is a navigation image or the like, a circuit group composed of the above-described shift registers 311, #0-#4, matching detection circuit 312 (#1) and counter 313 (#1) and latch 314 (#1) can detect the periodic patterns of four pixels included in it.

Although the count number until the counter 313 (#1) outputs overflow is eight in the above example, the number is not limited to this.

Similarly, the matching detection circuit 312 (#2) determines whether the current input pixel value outputted from the shift register 311 (0#) coincides with the input pixel value eight pixels before (eight pixels from the left in the line direction) outputted from the shift register 311 (#8).

When the matching detection circuit 312 (#1) are matched, the counter 313 (#2) increments its counter value. When the outputs are not matched, the counter 313 resets the counter value. Then, when the counter value reaches, for example, eight, the counter 313 (#1) outputs one overflow value 1 indicating the detection of eight periodic patterns to the latch 314 (#2).

When the matching detection circuit 312 (#2) detects their un-matching, the storage contents of the latch 314 (#2) is reset and until then stores the value outputted from the counter 313 (#2).

A circuit group composed of the above-described shift registers 311, #0-#8, matching detection circuit 312 (#2) and counter 313 (#2) and latch 314 (#2) can detect the periodic patterns of eight pixel included in a navigation image or the like.

Similarly, the matching detection circuit 312 (#3) determines whether the current input pixel value outputted from the shift register 311 (0#) coincides with the input pixel value 16 pixels before (16 pixels from the left in the line direction) outputted from the shift register 311 (#16).

When the matching detection circuit 312 (#3) are matched, the counter 313 (#3) increments its counter value. When the outputs are not matched, the counter 313 resets the counter value. Then, when the counter value reaches, for example, eight, the counter 313 (#3) outputs one overflow value 1 indicating the detection of 16 periodic patterns to the latch 314 (#3).

When the matching detection circuit 312 (#3) detects their un-matching, the storage contents of the latch 314 (#3) is reset and until then stores the value outputted from the counter 313 (#3).

A circuit group composed of the above-described shift registers 311, #0-#16, matching detection circuit 312 (#3) and counter 313 (#3) and latch 314 (#3) can detect the periodic patterns of 16 pixels included in a navigation image or the like.

Although a periodic pattern included in a navigation image is determined by the intension of the designer of the navigation image, they are often a fixed pattern of four, eight, 16 or 32. In this preferred embodiment, it is sufficient if the number of steps of the shift registers 311 and the number of periodic pattern detection groups is determined, using its characteristic.

Then, the priority encoder 315 outputs a cycle detection signal composed of a plurality of bits, for indicating that of respective cycle detection signals outputted from respective latches 314, #1-#3, the detection signal of the largest cycle, to the variable-length encoder 305 (#2) and the MPX 309 with priority.

Figure 11A:
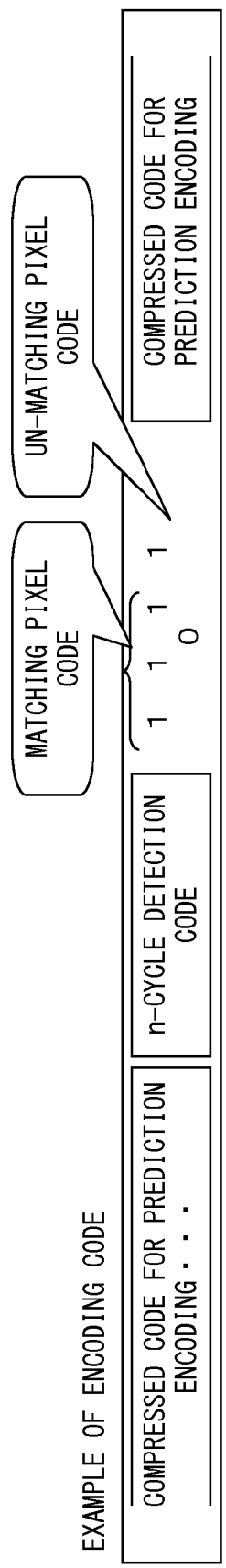
FIG. 11A is an example of the encoding format of compressed data Y.

As illustrated in FIG. 11A, when the cycle detection signal having n cycles (n=one of 4, 8 and 16) is outputted from the state where the n-cycle detection signal is not so far outputted from the priority encoder 315 yet, firstly, the variable-length encoder 305 (#2) stops the encoding of a prediction error quantization value outputted to the variable-length encoder 305 (#1) from the quantizer 304 and outputs the n-cycle detection code by variable-length encoding, such as a Huffman code or the like. Then, while following the n-cycle detection signal, the same n-cycle detection signal is outputted from the priority encoder 315 with the output timing of each pixel value, the variable-length encoder 305 (#2) outputs a matching pixel code 1 with the output timing of each pixel value. Then, when the n-cycle detection signal is not outputted from the priority encoder 315 yet, the variable-length encoder 305 (#2) outputs an un-matching code 0. Then, the variable-length encoder 305 (#2) re-starts the encoding of a prediction error quantization value outputted to the variable-length encoder 305 (#1) from the quantizer 304.

When it is detected by the operation of the above-described priority encoder 315 and variable-length encoder 305 (#2) that the periodic pattern of n-cycles is not included in the image data X, the variable-length encoder 305 (#1) outputs the variable-length code of a prediction error quantization value generated by prediction encoding as compressed data Y. When the n-cycle periodic pattern is included in the image data X, the variable-length encoder 305 (#2) outputs the code string of the n-cycle detection code and the matching pixel code 1 as compressed data Y. During this, the output of the variable-length encoder 305 (#1) is stopped.

While the n-cycle detection signal is not included in the compressed data Y, a decompression circuit, which will be described later, performs a normal decompression process by prediction coding. When detecting the n-cycle detection signal, the decompression circuit copies and outputs a decompression pixel value one cycle before, having the n-cycle width stored in the decompression circuit as the current decompression pixel value every time the decompression circuit detects a matching pixel code 1 following it.

Thus, while a periodic pattern of n cycles is included in image data X, compressed data Y can be expressed by only the code string of the n-cycle detection signal and a matching pixel code 1, for instructing the copy of a periodic pattern of n cycles. Thus, the amount of data of a variable-length encoded string in the section can be widely compressed, thereby widely compressing the amount of packet data transmitted to a vehicle-mounted LAN.

While no periodic pattern of n cycles is included in image data X, efficiently compressed data Y can be generated by normal prediction encoding.

In FIG. 3, the shift registers 310-#1 through #16 stores the decompression pixel values one through 16 pixels before outputted from the MPX 309 for the current pixel value while sequentially shifting them with each piece of pixel of timing.

Then, while the priority encoder 315 outputting the cycle detection signal of four cycles, the MPX 309 selects a decompression pixel value four pixels before (four pixels from the left in the line direction) stored in the shift register 311 (#4) and inputs it to the predictor 302. Simultaneously, the MPX 309 returns it to the shift register 310 #1. Similarly, while the priority encoder 315 outputting the cycle detection signal of the eighth cycle, the MPX 309 selects a decompression pixel value eight pixels before (eight pixels from the left in the line direction) stored in the shift register 311 (#4) and inputs it to the predictor 302. Simultaneously, the MPX 309 returns it to the shift register 310-#1. Similarly, while the priority encoder 315 outputting the cycle detection signal of 16 cycles, the MPX 309 selects a decompression pixel value 16 pixels before (16 pixels from the left in the line direction) stored in the shift register 311 (#16) and inputs it to the predictor 302. Simultaneously, the MPX 309 returns it to the shift register 310-#1.

Specifically, while a periodic pattern of n cycles (n=one of 4, 8 and 16) is not included in image data X, the predictor 302 performs a normal prediction operation on the basis of a decompression pixel value outputted from the adder 308. While the n-cycle periodic pattern is included in image data X, the predictor 302 continuously performs a prediction operation on the basis of a decompression pixel value repeatedly used with the n cycles stored in the shift register 310-#n. While the n-cycle periodic pattern is included in image data X, the output of the quantizer 304 is not outputted as compressed data Y. However, it is because a prediction operation is continued on the basis of a decompression pixel value on the decompression side in preparation of the re-start of the prediction operation when a periodic pattern is terminated that the predictor 302 continuously performs the prediction operation is on the basis of a repeatedly-used decompression pixel value even during this period.

Next, the video decompression device in the first preferred embodiment of the present invention, illustrated in FIG. 4 will be explained.

In FIG. 4, a variable-length decompressor 401, a de-quantizer 402, a predictor 403, an adder 404 and shift registers 406-#1 through #16 constitute a decompression circuit by prediction coding. The units excluding the variable-length decompressor 401 realize quite the same operations as the de-quantizer 307, predictor 302, adder 308 and shift registers 310-#1 through #16, respectively, illustrated in FIG. 3.

Specifically, firstly, the variable-length decompressor 401 decompresses the code of compressed data Y (see FIG. 3) extracted from a packet received from a vehicle-mounted LAN or the like, which is not illustrated in FIG. 4 by a network interface circuit. The encoding format of this piece of compressed data Y is already illustrated in FIG. 11A.

While neither the n-cycle periodic pattern is included in image data X nor the n-cycle detection signal illustrated in FIG. 11A is included in the received compressed data, the variable-length decompressor 401 extracts a prediction error quantization value from the compressed data Y and inputs the value to the de-quantizer 402. Simultaneously, the variable-length decompressor 401 enables the multiplexer (MPX) 405 to select the output of the adder 404.

As a result, the prediction error quantization value extracted from the compressed data Y is de-quantized by the de-quantizer 402 and a prediction error decompression value is obtained.

By the adder 404 adding this prediction error decompression value to a prediction pixel value outputted from the predictor 403, a decompression pixel value is reproduced.

Then, the decompression pixel value is selected by the MPX 405 and is outputted as decompressed image data X'. Decompressed image data X' is displayed, for example, on a display device installed on the back seat side of a vehicle.

This piece of decompression pixel value is fed back to the predictor 403 via the MPX 405 and is inputted for the prediction operation of a subsequent pixel. The decompression pixel value is also stored in the shift registers 406-#1 through #16 as a decompression pixel value for previous 16 pixels while the value is sequentially shifted every piece of pixel timing.

However, when the n-cycle periodic pattern (n=one of 4, 8 and 16) is included in image data X and the n-cycle detection signal illustrated in FIG. 11A is detected in the received compressed data, the variable-length decompressor 401 enables the MPX 405 to copy and output a decompression pixel value one cycle before, having the n-cycle width stored in the shift register 406-#6 as a decompressed image data X' corresponding to the current decompression pixel value.

This decompression pixel value one cycle before, having this n-cycle width is re-returned to the shift register 406-#1 and is repeatedly used while the n cycles continues. Simultaneously, the decompression pixel value is fed back to the predictor 403. While the n-cycle periodic pattern is included in the image data X, the output of the adder 404 is not outputted as the n-cycle periodic pattern. However, it is because of preparing for the re-start of the prediction operation when the periodic pattern is terminated that the predictor 403 continuously performs the prediction operation on the basis of the decompression pixel value repeatedly used even during this period.

When detecting an un-matching pixel code 0 from the received compressed data Y, following the matching pixel code 1 illustrated in FIG. 11A, then the variable-length decompressor 401 extracts a prediction error quantization value from the compressed data Y and re-starts an operation for inputting the value to the de-quantizer 402. Simultaneously, the variable-length decompressor 401 returns to a normal prediction operation by enabling the MPX 405 to select the output of the adder 404.

Second Embodiment

FIG. 5 is the circuit configuration of the compression encoding device in the second preferred embodiments of the present invention. The video decompression device in this preferred embodiment has the same circuit configuration as in the first preferred embodiment of the present invention illustrated in FIG. 4.

Although the earlier-described compression encoding device in the first preferred embodiment of the present invention has a function to detect a periodic pattern from the pixel value string of the original image of image data X, the compression encoding device in the second preferred embodiment of the present invention differs from the compression encoding device in the first preferred embodiment in that it has a function to detect a periodic pattern from a decompression pixel value instead of the original image.

The compression encoding device in the second preferred embodiment of the present invention illustrated in FIG. 5 will be explained below.

In FIG. 5, the units to which the same reference numerals are attached have the same function as in FIG. 3.

The configuration illustrated in FIG. 5 differs in that in the configuration illustrated in FIG. 3, each cycle detection signal inputted to the priority encoder 315 is generated by the matching detection circuit 312, the counter 313 and the latch 314 via the shift register 311 for storing the original image for a plurality of previous pixels outputted from the one-line memory 303, in the configuration of FIG. 5 each cycle detection signal outputted to the priority encoder 315 is generated by a comparison circuit 501, a threshold value circuit 502, a counter 503 and a latch 504 via the shift register 310 for storing a decompression pixel value for a plurality of previous pixels.

According to such a configuration, the shift register 311 for storing an original image for a plurality of previous pixels becomes unnecessary, thereby reducing its circuit scale.

In FIG. 5, the comparison circuit 501 (#1) compares the current input pixel value outputted from the one-line memory 301 with the decompression pixel value four pixels before (the fourth pixel from the left in the line direction) outputted from the shift register 310 (#4). This circuit includes, for example, a subtractor circuit for subtracting respective pixel values composed of eight bits from each other.

The threshold circuit 502 (#1) outputs a logical value for incrementing a value indicated by the counter 503 (#1) when the above subtraction result in which the current input pixel value almost coincides with a decompression pixel value four pixels before is smaller than a predetermined threshold value and outputs a logical value for resetting both the counter 503 (#1) and the latch 504 (#1) when the compression encoding device in the second preferred embodiment of the present invention does not coincide with the decompression pixel value four pixels before and the above subtraction result is larger than the predetermined value.

Both the above-described comparison circuit 501 and threshold value circuit 502 can also be replaced with a circuit for performing logical comparison between the current input pixel value and a decompression pixel value outputted from the shift register 310 (#4) using only respective predetermined higher-order bits and performing a matching/un-matching determination.

When the output of the threshold circuit 502 (#1) almost coincides with both the current input pixel value and a decompression pixel value four pixels before, the counter 503 (#1) increments its counter value. When the output of the threshold circuit 502 (#1) coincides with neither the current input pixel value nor the decompression pixel value four pixels before, the counter 503 (#1) resets the counter value. Then, when the counter value reaches, for example, eight, the counter 503 (#1) outputs an overflow value 1 indicating the detection of four periodic patterns in the latch 504 (#1).

When it is detected that the output of the threshold circuit 502 (#1) almost coincides with both the current input pixel value and a decompression pixel value four pixels before, the storage contents of the latch 504 (#1) is reset and stores the value so far outputted from the counter 503.

Thus, when image data X is a navigation image or the like, the periodic patterns of four pixels included in it can be detected by a circuit group composed of the comparison circuit 501 (#1), the threshold circuit 502 (#1), the counter 503 (#1) and the latch 504 (#1).

Similarly, the comparison circuit (#2) compares the current input pixel value outputted from the one-line memory 301 with a decompression pixel value eight pixels before (the eighth pixel from the left in the line direction) outputted from the shift register 310 (#8).

When the current input pixel value almost coincides with a decompression pixel value four pixels before and the above subtraction result is smaller than a predetermined threshold, the threshold value circuit 502 (#2) outputs a logical value for incrementing a value indicated by the counter 503 (#2). When the current input pixel value does not coincide with a decompression pixel value four pixels before and the above subtraction result is larger than a predetermined threshold, the threshold value circuit 502 (#2) outputs a logical value for resetting both the counter 503 (#2) and the latch 504 (#2).

When it is indicated that the output of the threshold circuit 502 (#1) almost coincides with both the current input pixel value and a decompression pixel value four pixels before, the counter 503 (#2) increments its counter value. When their un-matching is indicated, the counter 503 (#2) resets the counter value. Then, when the counter value reaches, for example, eight, the counter 503 (#2) outputs an overflow value 1 indicating the detection of eight periodic patterns in the latch 504 (#2).

Thus, when image data X is a navigation image or the like, the periodic patterns of eight pixels included in it can be detected by a circuit group composed of the comparison circuit 501 (#2), the threshold circuit 502 (#2), the counter 503 (#2) and the latch 504 (#2).

Similarly, the comparison circuit (#3) compares the current input pixel value outputted from the one-line memory 301 with a decompression pixel value 16 pixels before (the 16-th pixel from the left in the line direction) outputted from the shift register 310 (#16).

When the current input pixel value almost coincides with a decompression pixel 16 pixels before and the above subtraction value is smaller than a predetermined threshold value, the threshold value circuit 502 (#3) outputs a logical value for incrementing a value indicated by the counter 503 (#3). When the current input pixel value does not coincide with a decompression pixel value four pixels before and the above subtraction result is larger than a predetermined threshold, the threshold value circuit 502 (#3) outputs a logical value for resetting both the counter 503 (#3) and the latch 504 (#3).

When it is indicated that the output of the threshold circuit 502 (#3) almost coincides with both the current input pixel value and a decompression pixel value 16 pixels before, the counter 503 (#3) increments its counter value. When their un-matching is indicated, the counter 503 (#3) resets the counter value. Then, when the counter value reaches, for example, eight, the counter 503 (#3) outputs an overflow value 1 indicating the detection of 16 periodic patterns in the latch 504 (#3).

When it is detected that the output of the threshold circuit 502 (#3) almost coincides with neither the current input pixel value nor a decompression pixel value 16 pixels before, the storage contents of the latch 504 (#3) is reset and stores the value so far outputted from the counter 503.

Thus, when image data X is a navigation image or the like, the periodic patterns of 16 pixels included in it can be detected by a circuit group composed of the comparison circuit 501 (#3), the threshold circuit 502 (#3), the counter 503 (#3) and the latch 504 (#3).

Third Embodiment

FIGS. 6 and 7 are the circuit configurations of a video decompression device in the third preferred embodiments of the present invention. FIGS. 6 and 7 illustrate the circuit diagrams of a device compression encoding device and a video decompression device, respectively.

In the earlier-described first preferred embodiment of the present invention, when a periodic pattern is detected from image data X in a video compression encoding device, a pixel value one cycle before is copied and outputted in a video decompression device. However, in the third preferred embodiment of the present invention, when a periodic pattern is detected from image data X, in a video compression encoding device and a video decompression device, prediction encoding and its decompression are operated using a decompression pixel value one cycle before as the prediction pixel value of the current pixel.

Firstly, the video compression encoding device in the third preferred embodiment of the present invention illustrated in FIG. 6 will be explained.

In FIG. 6, the units to which the same reference numerals as in FIG. 3 are attached have the same function as in FIG. 3.

In the earlier-described configuration of FIG. 3, when an n-cycle periodic pattern is included in image data X, the output of the quantizer 304 is not outputted as compressed data Y. A previous decompression pixel value is repeatedly stored and used in the shift registers 310-#1 through #16 via the MPX 309.

However, in the configuration illustrated in FIG. 6, when a n-cycle periodic pattern is included in image data X, a decompression pixel value one cycle before, stored in the shift registers 310-#1 through #16 is supplied to the subtractor 303 via the MPX 601 as a new prediction pixel value and a prediction operation is performed on the basis of this value. The prediction error value obtained as a result is quantized by the quantizer 304 into a prediction error quantization value. After being encoded by variable length by the variable-length encoder 305 (#1), the value is outputted compressed data Y via the MPX 306.

By such a configuration, even when a texture-like periodic pattern is included in image data X, prediction encoding can be performed with high accuracy, thereby securing a high compression ratio without the deterioration of definition.

Figure 11B:
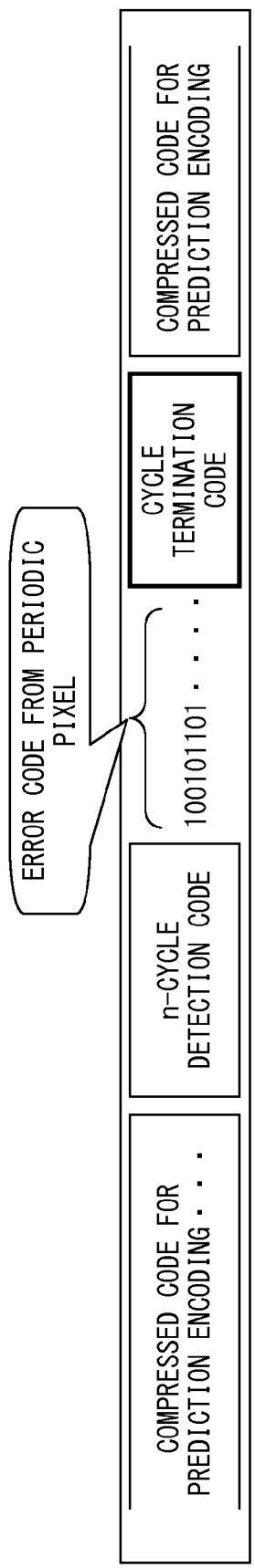
FIG. 11B is another example of the encoding format of compressed data Y.

When in the state where a cycle detection signal is not so far outputted from the priority encoder 315, as illustrated in FIG. 11B, a cycle detection signal of n cycles (n=one of 4, 8 and 16) is detected, the variable-length encoder 305 (#2) outputs a n-cycle detection signal by variable-length encoding, following the compression encoding of the prediction error quantization value currently outputted from the variable-length encoder 305 (#1). Then, the variable-length encoder 305 (#2) enables the variable-length encoder 305 (#1) to perform the encoding of the prediction error quantization value again. Encoded prediction error quantization values outputted after this are values obtained by performing a prediction operation on the basis of a decompression pixel value one cycle before having an n-cycle width. When no n-cycle detection signal is outputted from the priority encoder 315, the variable-length encoder 305 (#2) encodes and output a cycle termination signal by variable length. Then, the variable-length encoder 305 (#2) enables the variable-length encoder 305 (#1) to re-start the encoding of a prediction quantization error value outputted from the quantizer 304. Encoded prediction error quantization values outputted after this are values obtained by normal prediction encoding.

While the priority encoder 315 is outputting a four-cycle detection signal, the MPX 601 selects a decompression pixel value four pixels before (four pixels from the left in the line direction), stored in the shift register 310-#4 and gives the value to the subtractor 303 a prediction value. While the priority encoder 315 is outputting an eight-cycle detection signal, the MPX 601 selects a decompression pixel value eight pixels before (eight pixels from the left in the line direction), stored in the shift register 310-#8 and gives the value to the subtractor 303 a prediction value. While the priority encoder 315 is outputting a 16-cycle detection signal, the MPX 601 selects a decompression pixel value 16 pixels before (16 pixels from the left in the line direction), stored in the shift register 310-#16 and gives the value to the subtractor 303 a prediction value.

Thus, even while an n-cycle periodic pattern is included in image data X, prediction encoding can be performed with high accuracy on the basis of a decompression pixel value one cycle before, thereby securing high definition and a high compression ratio without the deterioration of definition at the same time.

Next, the video decompression device in the third preferred embodiment of the present invention, illustrated in FIG. 7 will be explained.

In FIG. 7, a variable-length decompresser 701, a de-quantizer 702, a predictor 703, an MPX 704, an adder 705 and shift registers 706-#1 through #16 constitute a decompression circuit by prediction coding. The units excluding the variable-length decompressor 701 realize quite the same operations as the de-quantizer 307, predictor 302, MPX 601, adder 308 and shift registers 310-#1 through #16 illustrated in FIG. 6.

Specifically, firstly the variable-length decompressor 701 decompresses the code of compressed data Y extracted from a packet received by a network interface circuit, such as a vehicle-mounted LAN or the like, which is not illustrated in FIG. 7 (see FIG. 6). The encoding format of this piece of compressed data Y is as per illustrated in FIG. 11B.

While neither an n-cycle periodic pattern is included in image data X nor the n-cycle detection code illustrated in FIG. 11B is included in the received compressed data Y, the variable-length decompressor 701 extracts an encoded prediction error quantization value from the compressed data Y and inputs the result to the de-quantizer 702. Simultaneously, the variable-length decompressor 701 enables the multiplexer (MPX) 704 to select the output of the predictor 703.

The adder 705 adds an prediction error decompression value inputted from the de-quantizer 702 to a prediction pixel value inputted from the predictor 703 via the MPX 704.

As a result, a decompression pixel value is decompressed and is outputted as decompressed image data X'. This piece of decompressed image data X' is displayed on a display device installed, for example, on the back-seat side of a vehicle.

This decompression pixel value is fed back to the predictor 703 and is used as input for the prediction operation of a subsequent pixel. The decompression pixel value is also stored in the shift registers 706-#1 through #16 as decompression pixel values for previous 16 pixels while they are sequentially shifted every piece of pixel timing.

However, when a n-cycle (n=one of 4, 8 and 16) periodic pattern is included in image data X and the n-cycle detection code illustrated in FIG. 11B is detected from the received compressed data Y, the variable-length decompressor 701 enables the MPX 704 to select a decompression pixel value one cycle before having a n-cycle width, stored in the shift register 406-#n. Then, the variable-length decompressor 701 extract an encoded error quantization value detected following the n-cycle detection code illustrated in FIG. 11B from the compressed data Y and decompresses it. Then, the variable-length decompressor 701 inputs the result to the de-quantizer 702.

As a result, the MPX 704 selects the decompression pixel value before one cycle having a n-cycle width, stored in the shift register 406-#n and gives the value to the adder 705.

Thus, even while a n-cycle periodic pattern is included in image data X, a decompression pixel value can be obtained from both a decompression pixel value one cycle before and a prediction error decompression value predicted/encoded with high accuracy, thereby decompressing decompressed image data X'.

Fourth Embodiment

Figure 8:
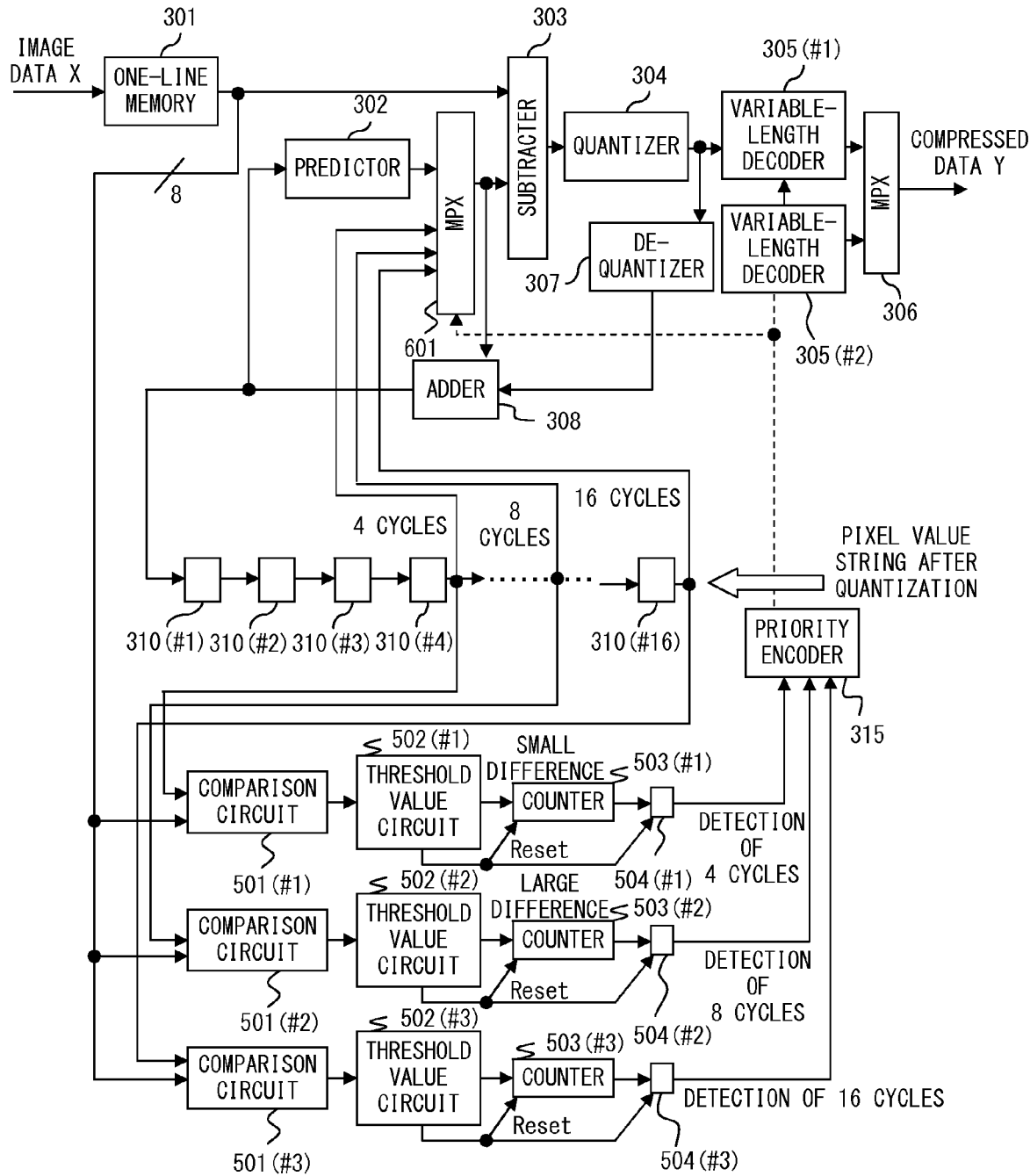
FIG. 8 is a circuit configuration of a compression encoding device in the fourth preferred embodiments of the present invention.

FIG. 8 is the circuit configuration of a video compression encoding device in the fourth preferred embodiments of the present invention. The video decompression device in this preferred embodiment is the same as that in the third preferred embodiments of the present invention, whose circuit diagram is illustrated in FIG. 7.

Although the earlier-described video compression encoding device in the third preferred embodiment of the present invention has a function to detect a periodic pattern from the original-image pixel value string of image data X, the video compression encoding device in the fourth preferred embodiment of the present invention has a function to detect a periodic pattern from a decompression pixel value instead of an original image like that in the second preferred embodiment of the present invention, illustrated in FIG. 5.

The video compression encoding device in the fourth preferred embodiments of the present invention, illustrated in FIG. 8 will be explained below.

In FIG. 8, the units to which the same reference numerals as in FIGS. 5 and 6 are attached have the same function as that as in FIGS. 5 and 6.

Specifically, the configurations and operations of 301 through 308 and 601 for performing prediction encoding are the same those in FIG. 6, respectively. While an n-cycle periodic pattern is included in image data X, decompression pixel values one cycle before, stored in the shift registers 310-#1 through #16 are supplied to the subtractor 303 via the MPX 601 as new prediction pixel values and prediction operations are performed on the basis of the values. Prediction error values obtained as a result are outputted via the quantizer 304, the variable-length encoder 305 (#1) and the MPX 306 as compressed data Y.

However, the configurations and operations of 501 through 504 for detecting a periodic pattern are the same those in FIG. 5, respectively. Respective cycle detection signals inputted to the priority encoder 315 are generated by the comparison circuit 501, the threshold value circuit 502, the counter 503 and the latch 504.

By such a configuration, the shift register 311 for storing a plurality of pixels of an original image becomes unnecessary, thereby reducing its circuit scale.

Fifth Embodiment

FIG. 9 is the circuit configuration of the video compression encoding device in the fifth preferred embodiments of the present invention. The video decompression device in this preferred embodiment is the same as that in the third preferred embodiments of the present invention, whose circuit diagram is illustrated in FIG. 7.

In the video compression encoding devices in the first through fourth preferred embodiments of the present invention, after a periodic pattern is detected, after the periodic pattern, for example, for eight count is determined in the counter 313 or 503, the mode is switched over to a cycle mode and encoding is performed. Therefore, the switch of the process delays for that amount.

Therefore, in the fifth preferred embodiment of the present invention illustrated in FIG. 9, a configuration for removing such delay or for preventing a flat image having no periodic pattern from being wrongly determined to be a periodic pattern image will be disclosed using the configuration of the third preferred embodiment of the present invention as its one example. The same concept is also applicable to the other preferred embodiments.

In FIG. 9, the units to which the same reference numerals as in FIG. 6 are attached have the same functions as in FIG. 6.

In the preferred embodiment illustrated in FIG. 9 it is assumed that the counter value by which the counters 313-#1 through #3 are overflowed is 4.

Firstly, a pixel value inputted to the subtractor 303 is the output of the shift register 310-#1 four pixel values before the current pixel value, corresponding to the overflow value=4 of the counters 313-#1 through #3 instead of the current pixel value outputted from the one-line memory 301.

In accordance with this, a cycle detection signal (a plurality of bits) including one for the current latch, outputted from the priority encoder 315 is also given to the variable-length encoder 305 (#2) and the MPX 601 after being stored in the shift registers 904-#1 through #4.

Then, at the starting time of a periodic time, that is, when a cycle detection signal stored in the shift register 904-#1 corresponding to a signal one pixel before indicates zero, the priority encoder 315 presets a newly-detected n-cycle detection signal in all the shift registers 310-#1 through #4 and makes cycle determination go back for four pixel values.

Thus, process delay for a counter value by which the counters 313-#1 through #3 overflow can be compensated.

Next, a matching detection circuit 901, a counter 902 and a latch 903 constitute a circuit group for detecting a flat image part having no periodic pattern.

Firstly, the matching detection circuit 901 detects whether the current input pixel value outputted from the shift register 311 (#0) coincides with an input pixel value one pixel before (one pixel from the left in the line direction) outputted from the shift register 311 (#1). This circuit can be realized by the same configuration as the matching detection circuit 312.

The counter 902 increments its counter value when the output of the matching detection circuit 901 indicates matching and decrements the counter value when it indicates un-matching.

Then, a predetermined higher-bit value (one bit) of the counter 902 is latched by the latch 903.

By this configuration, in an area having the same pixel value (allowing somewhat un-matching) as an immediately previous pixel value, the counter value of the counter 902 continues to rise, 1 is set in the latch 903 and a flat part can be determined by this logical value.

While a logical value 1 is set in the latch 903, the priority encoder 315 outputs data of all bits 0 indicating that a cycle is not detected yet to the shift register 904-#0 even while the latches 314-#1 through #3 are outputting cycle detection signals.

By the above configuration, even when an area composed of strictly periodic patterns from which flat parts are excluded can be detected and encoded.

The counter values of the counters 313-#1 through #3 can be 8 as in FIG. 6. However, in that case, the output of the shift register 311-#8 is inputted to the subtractor 303 and the number of steps of the shift register 904 becomes 8 of #1 through #8.

Detailed Study of Encoding

In order to explain the detailed operation of the above-described preferred embodiments of the present invention, their actual encoding will be explained below.

Figure 12A:
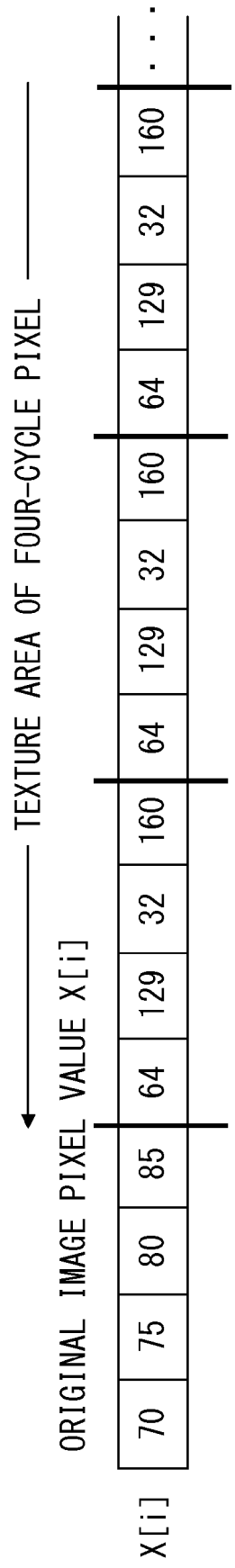
FIG. 12A explains the encoding operation in each preferred embodiment of the present invention (No. 1-1).

FIG. 12A is an example of the pixel value string of image data X[i] and it is assumed that there exits a texture area having a four-pixel cycle from the fifth pixel.

The case where frond-end prediction is applied to this piece of image data and 15-level quantization is performed using the section and representative value illustrated in FIG. 12B will be studied below.

FIG. 13A is an example of a decompression pixel value X[i]' in the case where only normal front-end prediction quantization is applied to the image data X[i] in FIG. 12A. When gradation greatly changes in a texture area, the maximum value of a quantizer cannot catch up with a prediction error E [i] in the output of the quantizer and its difference with an original image increases, thereby deteriorating its definition. In this case, since the maximum quantization number is used, the amount of encoding increases up to its maximum.

Next, the case where the first and third preferred embodiments of the present invention are applied will be explained.

The case where if in the detection of a texture area, there occurs the consecutive matching of a four-pixel cycle twice in the second cycle, it is determined that the detection enters a texture area will be studied below. As to how to reflect the determination result in encoding, there are two ways of thinking.

(1) After consecutive matching is detected in the second cycle, the determination result is delayed by the number of determined pixels and reflected.

(2) After consecutive matching is detected in the second cycle, it is reflected retroactively to the head of the second cycle.

The above (2) corresponds to the fifth preferred embodiment of the present invention. However, in this example, for the purpose of better understanding it is assumed that it is delayed by the number of determined pixels (two pixels in this case) and reflected.

FIG. 13B corresponds to the first preferred embodiment of the present invention and is an example of a decompression pixel value X[1]' in the case where an original image is reproduced by detecting a periodic pattern (texture area) from an original image and copying a decompression pixel value one cycle before. In this case, encoding is performed in such a way that a decompression pixel value one cycle before may be outputted after a texture area is detected. Therefore, a texture area can be encoded by one bit for each pixel as long as the texture area continues (see FIG. 11A), thereby not increasing the amount of codes. However, since a decompression pixel one cycle before is repeatedly used, its definition somewhat deteriorates.

FIG. 13C corresponds to the third preferred embodiment of the present invention and is an example of a decompression pixel value X[i]' in the case where a periodic pattern (texture area) is detected from an original image and is predicted/encoded by a prediction pixel value one cycle before. In this case, after a texture area is detected, prediction sequentially becomes more accurate in the second cycle and after, and lastly a decompression pixel value is converged to the minimum quantization error. Although it takes several cycles to be converged and a quantization number sequentially becomes smaller, thereby suppressing the amount of codes. If you want to improve both the amount of codes and definition, this method is optimal.

When a periodic pattern is detected from a periodic pixel value as the earlier-described second or fourth preferred embodiment, as illustrated in FIG. 13A, there is a possibility that a cycle in which a prediction error quantization value E[i]' becomes at the maximum quantization level in the texture area each time and does not essentially exist in a decompression pixel value, may occur. However, especially in the fourth preferred embodiment of the present invention, since a decompression pixel value is sequentially converged to the input pixel value of an original image, an essential cycle is returned from a cycle different from one of the original image. In the example illustrated in FIG. 13A, although firstly a two-pixel cycle is detected, after several cycles a four-pixel cycle is detected from the decompression pixel value. Thus, by constituting the preferred embodiment of the present invention well, a video compression/decompression device both the amount of codes and definition of which are improved can be constituted.

Sixth Embodiment

FIG. 14 is the circuit configuration of the compression encoding device in the sixth preferred embodiments of the present invention. The video decompression device in this preferred embodiment has the same circuit configuration as that of the third preferred embodiment, illustrated in FIG. 7.

In the earlier-described first through fifth preferred embodiments of the present invention, when patterns are completely matched, its mode is switched over to a cycle mode and encoding is performed. Since in order to switch over to the cycle mode, a cycle detection code is necessary, sometimes prediction encoding by a predictor requiring no detection code is more efficient. In the sixth preferred embodiment of the present invention, prediction encoding whose encoding efficiency is best of four, eight and 16 cycles and predictors can be selected while taking into consideration the increase of the amount of generated codes due to a cycle detection code for each block (for example, units of one vertical pixel×horizontal eight pixels).

In this case, in the video compression encoding device, a means for detecting a cycle for each block calculates a prediction error one cycle before by n cycles (n=one of 4, 8 and 16) and also a prediction error by another predictor. Then, these errors are compared in each block section. More specifically, the absolute sums of the prediction errors of all pixels in a block in each cycle are accumulated in units of blocks. If the prediction error absolute sum one cycle before is extremely small, it is determined that a cycle pattern is detected (when the prediction error absolute sums are completely matched, the absolute sum becomes 0). Conversely, any prediction error absolute sum is not meaningfully larger than a prediction error absolute sum by a predictor 1405, prediction encoding by the predictor 302 is performed taking into consideration overhead due to a cycle detection code. In this case, the cycle detection code is not outputted.

In FIG. 14, the units to which the same reference numerals are attached have the same function as in FIG. 6. In FIG. 14, as in FIG. 6, when an n-cycle periodic pattern is included in image data X, firstly a decompression pixel value one cycle before, stored in a shift register is supplied to the subtractor 303 via the MPX 601 as a new prediction pixel value and a prediction operation is performed on the basis of this value. The prediction error value obtained by this is quantized to a prediction error quantization value by the quantizer 304. Then, after being encoded using variable length by the variable-length code 305 (#1), it is outputted as compressed data Y via the MPX 306.

The configuration illustrated in FIG. 14 differs from the configuration illustrated in FIG. 6 in that it includes differential absolute value calculators 1402 (#1-#3) for calculating its difference with a pixel one cycle before having n cycles (n=one of 4, 8 and 12) and calculating an absolute value, and adders 1403 (#1-#3) and latches 1404 (#1-#3) for accumulating these absolute values for each block (four pixels) and calculating a prediction error absolute sum. The configuration illustrated in FIG. 14 also includes a predictor 1405 for predicting an original image string in order to determine whether it has a meaningful difference, a differential absolute value calculator 1406 for calculating its difference with the predicted value and calculating an absolute value, as in the case of n cycles (n=one of 4, 8 and 12), and an adder 1407 and a latch 1408, for calculating a prediction error absolute sum for each block (four pixels) on the basis of the absolute value. This predictor 1405 adopts completely the same or almost the same prediction method as the predictor 302. While the predictor 302 uses a value after quantization as input, the predictor 1405 uses an original image string as input.

When the prediction error absolute sum of each cycle, for one block and a prediction error absolute sum by the predictor 302 are calculated, these values are transmitted to the priority encoder 315 via the latches 1404 (#1-#3) and 1408. Simultaneously, the adder 1403 (#1-#3) and 1407, and the latches 1404 (#1-#3) and 1408 are reset by the output of a pixel value counter 1409 to prepare for the process of a subsequent block.

The priority encoder 315 detects a periodic pattern on the basis of respective prediction error absolute sums of n cycles (n=one of 4, 8 and 12) and a prediction error absolute sum from the predictor 1405. When each prediction error absolute sum of n cycles is extremely small, the priority encoder 315 determines that a cycle is detected (in the case of complete matching, the absolute sum becomes 0) and continues to output the n-cycle detection signal during the period of a target block.

For example, in the case one block=four pixels, when there is a periodic pattern whose prediction error absolute value sun is four or less, an average error per pixel becomes approximately one. Since such a small error is recognized as a periodic pattern by human eyes, the priority encoder 315 instructs the MPX 601 and the variable-length encoder 305 (#2) to perform an encoding process using the periodic pattern during the period of the block. When the prediction error absolute sum of each periodic pattern is not meaningfully small compared with a prediction error absolute sum by the predictor 1405, the priority encoder 315 instructs the MPX 601 and the variable-length encoder 305 (#2) not to output a periodic detection signal during the block period taking into consideration overhead due to a cycle detection signal.

Whether the prediction error absolute sum is meaningfully small or not is determined by a prediction error value and the length of a periodic detection code. For example, when the length of a periodic detection code is four, it is necessary that a code length obtained by an encoding by the periodic pattern is longer than a code length obtained by the encoding of a predictor by four or more. Therefore, when coding is adopted in such a way that one bit increases every time the prediction error is eight or more, it is necessary that the prediction error absolute sum of the periodic pattern is smaller than a prediction error absolute sum by the predictor 1405 by (=8×4) (in case one block=four pixels) or more.

In the video compression encoding device in this preferred embodiment illustrated in FIG. 14, respective texture-like periodic patterns of four, eight and 16 pixels, included in a navigation image can be detected. Naturally, another periodic pattern can also be detected taking into consideration the characteristic of a navigation image to be processed or the like.

The variable-length encoder 305 (#2) checks whether an n-cycle (n=one of 4, 8 and 12) detection signal is outputted in the state where no cycle detection signal is outputted from the priority encoder 315 every block break. When the cycle detection signal is outputted, as illustrated in FIG. 11B, the variable-length encoder 305 (#2) outputs an n-cycle detection code by variable-length encoding, following the compressed code of a prediction error quantization value currently outputted from the variable-length encoder 305 (#1). Then, the variable-length encoder 305 (#2) enables the variable-length encoder 305 (#1) to encode the prediction error quantization value again. Encoded prediction error quantization values outputted after this are obtained by performing a prediction operation on the basis of a decompression pixel value one cycle before, having an n-cycle width.

Then, the variable-length encoder 305 (#2) checks whether the priority encoder 315 outputs an n-cycle detection signal every block break. While no n-cycle detection signal is outputted, the variable-length encoder 305 (#2) encoded a cycle termination signal by variable length and outputs the cycle termination signal. Then, the variable-length encoder 305 (#2) enables the variable-length encoder 305 (#1) to re-start the encoding of a prediction error quantization value outputted from the quantizer 304. Encoded prediction error quantization values outputted after this are obtained by normal prediction encoding.

While a four-cycle detection signal is outputted from the priority encoder 315, the MPX 601 selects a decompression pixel value four pixels before (four pixels from the left in the line direction), stored in the shift register 310 (#4) and gives the value to the subtractor 303. While a eight-cycle detection signal is outputted from the priority encoder 315, the MPX 601 selects a decompression pixel value eight pixels before (eight pixels from the left in the line direction), stored in the shift register 310 (#8), which is not illustrated in FIG. 14, and gives the value to the subtractor 303. While a 16-cycle detection signal is outputted by the priority encoder 315, the MPX 601 selects a decompression pixel value 16 pixels before (16 pixels from the left in the line direction), stored in the shift register 310 (#16) and gives the value to the subtractor 303.

Thus, even while an n-cycle pattern is included in image data X, prediction encoding can be performed with high accuracy on the basis of a decompression pixel value one cycle before, thereby realizing high definition and a high compression ratio at the same time.

Next the video decompression device in the sixth preferred embodiment of the present invention will be explained with reference to FIG. 7. The operation of this video decompression device is completely the same as that in the third preferred embodiment, in which the process is switched over by whether an n-cycle detection signal is included.

In FIG. 7, a variable-length decompressor 701, a de-quantizer 702, a predictor 703, an MPX 704, an adder 705 and shift registers 706 (#1-#16) constitute a video compression circuit by prediction coding.

In this preferred embodiment, firstly the variable-length decompressor 701 decompresses the code of compressed data Y extracted from a packet received by a network interface circuit from a vehicle-mounted LAN or the like, which is not illustrated in FIG. 7. The encoding format of this piece of compressed data Y is as per illustrated in FIG. 11B.

While no n-cycle periodic pattern is included in image data X and the n-cycle detection code illustrated in FIG. 11B is not included in the received compressed data Y, the variable-length decompressor 701 extracts encoded prediction error quantization value from the compressed data Y, decompresses the value and inputs the result to the de-quantizer 702. Simultaneously, the variable-length decompressor 701 enables the MPX 704 to select the output of the predictor 703.

The adder 705 adds a prediction error decompression value inputted from the de-quantizer 702 to a prediction pixel value inputted from the predictor 703 via the MPX 704.

As a result, a decompression pixel value is reproduced and is outputted as decompressed image data X'. This piece of decompressed image data X' is displayed, for example, on a display device installed on the back-seat side of a vehicle.

This decompression pixel value is fed back to the predictor 703 and is prepared to be inputted for the prediction operation of a subsequent pixel. The decompression pixel value is stored in the shift registers 706 (#1-#16) as a decompression pixel value for 16 previous pixels while being sequentially shifted every piece of pixel timing.

However, while an n-cycle (n=one of 4, 8 and 16) periodic pattern is included in image data X and the n-cycle detection code illustrated in FIG. 11B is detected from the received data Y, the variable-length decompressor 701 enables the MPX 704 to select a decompression pixel value one cycle before, having an n-cycle width, stored in the shift register 406 (#n) until the cycle termination signal illustrated in FIG. 11B is detected from the compressed data Y. Then, the variable-length decompressor 701 extracts an encoded prediction error quantization value detected following the n-cycle detection code illustrated in FIG. 11B, from the compressed data Y, decompresses the value and inputs the result to the de-quantizer 702.

As a result, the MPX 704 selects the decompression pixel value one cycle before, having an n-cycle width, stored in the shift register 406 (#n) and adds the value to the adder 705.

Thus, in this preferred embodiment, even while an n-cycle periodic pattern is included in image data X, can obtain a decompression pixel value by a cycle detection code from a decompression pixel value one cycle before and a prediction error decompression value encoded with high accuracy and decompress a decompressed image data X'. In addition to this, in this preferred embodiment, of the decompression pixel value one cycle before of each cycle and the outputs of a predictor, one whose encoding efficiency is highest can be selected while taking into consideration the increase of the amount of codes generated in a certain block section.

Although in the fifth preferred embodiment illustrated in FIG. 9, a configuration for preventing its delay and a configuration for preventing a flat image with no periodic pattern from being wrongly determined to be a periodic pattern image is disclosed as one example of the third preferred embodiment of the present invention illustrated in FIG. 6, the same configuration is also applicable to this preferred embodiment.

Supplement for Each Preferred Embodiment of the Present Invention

In each above-described preferred embodiment, the functions of the shift registers 310, 311, 406, 706, 904 and the like can also be realized by FIFO (first-in first-out) type of memory or RAM (random-access memory) or the like.

Figure 15:
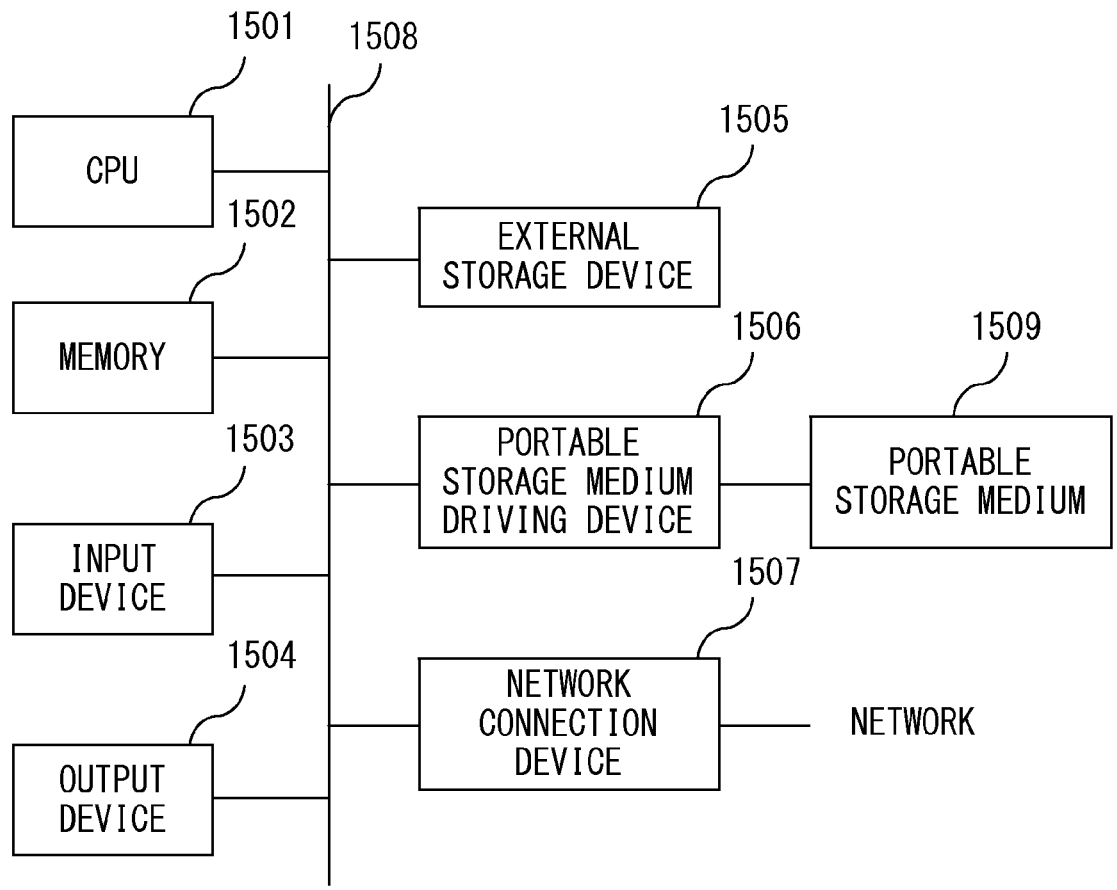
FIG. 15 is a configuration of a computer for executing the program function in each preferred embodiment of the present invention.

Realization of Each Preferred Embodiment of the Present Invention by Computer Program FIG. 15 is one example of the hardware configuration of a computer for realizing the same function as realized by respective preferred embodiments of the present invention, illustrated in FIGS. 3 through 9.

The computer illustrated in FIG. 15 is realized as, for example, a vehicle-mounted computer. The computer includes a CPU 1501, memory 1502, an input device 1503, an output device 1504, an external storage device 1505, a portable storage medium driving device 1506 in which a portable storage medium 1509 is inserted and a network connection device 1507, which are connected to each other via a bus 1508. The configuration illustrated in FIG. 15 is one example of a computer for realizing the above system and the configuration of such a computer is not limited to this.

The CPU 1501 controls the entire computer. The memory 1502 is memory, such as RAM, for temporarily storing a program or data, stored in the external storage device 1505 (or the portable storage medium 1509) at the time of data update and the like. The CPU 1501 controls the entire system by reading the program into the memory 1502 and executing the program.

The input device 1503 includes, for example, a keyboard, a touch panel, etc. and their interface control devices. The input device 1503 detects the input operation of a user by a keyboard, a touch panel, etc. and notifies the CPU of the detection result.

The output device 1504 includes a display, a printer, etc. and their interface control devices. The output device 1504 outputs data transmitted under the control of the CPU 1501 to a display device and a printing device.

The external storage device 1505 is, for example, a hard disk storage device. The external storage device 1505 is mainly used to store various types of data and programs.

The portable storage medium driving device 1506 accommodates portable storage media 1509, such as an optical disk, SDRAM, Compact Flash (trade mark) and the like and supplements the external storage device 1505.

The network connection device 1507 is a device for connecting a communication line, such as a vehicle-mounted LAN.

The system illustrated in FIG. 15 can be realized by the CPU 1501 executing the program mounting the same function as the function realized by the configurations illustrated in FIGS. 3 through 9. The program can be recorded in, for example, the external storage device 1505 or the portable storage medium 1509. Alternatively, the program can be obtained from a network by the network connection device 1507.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A video compression encoding device comprising:
a prediction unit to calculate a prediction pixel value for predicting a current input pixel value on the basis of image data;
a prediction error calculation unit to calculate a prediction error value between the current input pixel value and the prediction pixel value;
a quantization unit to quantize the prediction error value and to calculate a prediction error quantization value;
a prediction error encoding unit to encode the prediction error quantization value and to output the value as compressed data;
a decompression unit to decompress a decompression pixel value on a decompression side from the prediction error quantization value and the prediction pixel value and to give the value to the prediction unit, for compressing/encoding the image data by prediction encoding and outputting the compressed data;
a previous decompression pixel value storage unit to store decompression pixel values outputted from the decompression device, for a predetermined number of pixels of pixels immediately before a focus pixel;
a periodic pattern area detection unit to detect a periodic pattern which is included in the image data and in which a pixel value is regularly repeated in a scanning direction;
a periodic pattern encoding unit to encode information about the periodic pattern, to output the information including a period detection signal indicating how many cycles exist and a pixel code, as part of the compressed data and to stop an output of the prediction error encoding unit when the periodic pattern area is detected; and
a selection unit to read a decompression pixel value one cycle before corresponding to the periodic pattern from the previous decompression pixel value storage unit, to give the value to the prediction unit instead of a decompression pixel value outputted from the decompression unit and also to re-store the value in the previous decompression pixel value storage unit when the periodic pattern area is detected.

2. A video decompression device comprising:
a prediction error decompression unit to decompress a prediction error decompression value from received compressed data;
a prediction unit to calculate a prediction pixel value for predicting a current decompression pixel value and a decompression pixel value calculation unit to calculate the decompression pixel value from the prediction pixel value and the prediction error decompression value, to output the value as image data and also to give the value to the prediction unit, for decompressing the image data from compressed data compressed/encoded by prediction encoding;
a previous decompression pixel value storage unit to store decompression pixel values outputted from the decompression pixel value calculation unit, for a predetermined number of pixels of pixels immediately before a focus pixel;
a periodic pattern decompression unit to decompress information including a period detection signal indicating how many cycles exist and a pixel code, about a periodic pattern included on an input pixel value from the compressed data; and
a selection unit to read a decompression pixel value one cycle before corresponding to the periodic pattern from the previous decompression pixel value storage unit, to output the value as the image data instead of a decompression pixel value outputted from the decompression pixel value calculation unit, also to re-store the value in the previous decompression pixel value storage unit and to give the value to the prediction unit when information about the periodic pattern is detected.

3. A video compression encoding device comprising:
a prediction unit to calculate a prediction pixel value for predicting a current input pixel value on the basis of image data;
a prediction error calculation unit to calculate a prediction error value between the current input pixel value and the prediction pixel value;
a quantization unit to quantize the prediction error value and to calculate a prediction error quantization value;
a prediction error encoding unit to encode the prediction error quantization value and to output the value as compressed data and a decompression unit to decompress a decompression pixel value on a decompression side from the prediction error quantization value and the prediction pixel value and to give the value to the prediction unit, for compressing/encoding the image data by prediction encoding and outputting the compressed data;
a previous decompression pixel value storage unit to store decompression pixel values outputted from the decompression device, for a predetermined number of pixels of pixels immediately before a focus pixel;
a periodic pattern area detection unit to detect a periodic pattern in which a pixel value is regularly repeated in a scanning direction;
a periodic pattern encoding unit to encode information about the periodic pattern and to output the information including a period detection signal indicating how many cycles exist and a pixel code, as part of the compressed data when the periodic pattern area is detected; and
a selection unit to read a decompression pixel value one cycle before corresponding to the periodic pattern from the previous decompression pixel value storage unit and to give the value to the prediction error calculation unit instead of a prediction pixel value outputted from the prediction unit when the periodic pattern area is detected.

4. A video decompression device comprising:
a prediction error decompression unit to decompress a prediction error decompression value from received compressed data;
a prediction unit to calculate a prediction pixel value for predicting a current decompression pixel value and a decompression pixel value calculation unit to calculate the decompression pixel value from the prediction pixel value and the prediction error decompression value, to output the value as image data and also to give the value to the prediction unit, for decompressing the image data from compressed data compressed/encoded by prediction encoding;
a previous decompression pixel value storage unit to store decompression pixel values outputted from the decompression pixel value calculation unit, for a predetermined number of pixels of pixels immediately before a focus pixel;
a periodic pattern decompression unit to decompress information including a period detection signal indicating how many cycles exist and a pixel code, about a periodic pattern included on an input pixel value from the compressed data; and
a selection unit to read a decompression pixel value one cycle before corresponding to the periodic pattern from the previous decompression pixel value storage unit and to output the value to the decompression pixel value calculation unit, instead of a compression pixel value outputted from the prediction unit when information about the periodic pattern is detected.

5. The video compression encoding device according to claim 1, wherein the periodic pattern area detection unit comprises
a previous input pixel value storage unit to store the input pixel values for a predetermined number of pixels of pixels immediately before a focus pixel;
a cycle detection unit to detect that a current input pixel value coincides with an input pixel value stored in the previous input pixel value storage unit away from the current input pixel value by the number of pixels corresponding to a predetermined cycle, of each of the predetermined cycles consecutively a predetermined matching times; and
an encoder unit to select output of one corresponding to the longest cycle, of the respective cycle detection units and to output a signal indicating that a periodic pattern area of the cycle is detected.

6. The video compression encoding device according to claim 3, wherein the periodic pattern area detection unit comprises
a previous input pixel value storage unit to store the input pixel values for a predetermined number of pixels of pixels immediately before a focus pixel;
a cycle detection unit to detect that a current input pixel value coincides with an input pixel value stored in the previous input pixel value storage unit away from the current input pixel value by the number of pixels corresponding to a predetermined cycle, of each of the predetermined cycles consecutively a predetermined matching times; and
an encoder unit to select output of one corresponding to the longest cycle, of the respective cycle detection units and to output a signal indicating that a periodic pattern area of the cycle is detected.

7. The video compression encoding device according to claim 1, wherein the periodic pattern area detection unit comprises
a cycle detection unit to detect that a difference between a current input pixel value and a decompression pixel value stored in the previous decompression pixel value storage unit away from the current input pixel value by the number of pixels corresponding to a predetermined cycle, of each of the predetermined cycles is equal to or less than a predetermined threshold value consecutively a predetermined matching times; and
an encoder unit to select output of one corresponding to the longest cycle, of the respective cycle detection units and to output a signal indicating that a periodic pattern area of the cycle is detected.

8. The video compression encoding device according to claim 3, wherein the periodic pattern area detection unit comprises
a cycle detection unit to detect that a difference between a current input pixel value and a decompression pixel value stored in the previous decompression pixel value storage unit away from the current input pixel value by the number of pixels corresponding to a predetermined cycle, of each of the predetermined cycles is equal to or less than a predetermined threshold value consecutively a predetermined matching times; and
an encoder unit to select output of one corresponding to the longest cycle, of the respective cycle detection units and to output a signal indicating that a periodic pattern area of the cycle is detected.

9. The video compression encoding device according to claim 1, wherein when there are a plurality of periodic pattern areas to be detected, in the input pixel value or the decompression pixel value, the periodic pattern area detection unit calculates a prediction error absolute sum by accumulating a differential absolute value between the input pixel value or the decompression pixel value to be currently processed and a pixel value one cycle before in each periodic pattern area in a scanning direction in a specific section and determines one whose accumulation result is small, of prediction error absolute sums in respective periodic pattern areas as a periodic pattern area in the section.

10. The video compression encoding device according to claim 3, wherein when there are a plurality of periodic pattern areas to be detected, in the input pixel value or the decompression pixel value, the periodic pattern area detection unit calculates a prediction error absolute sum by accumulating a differential absolute value between the input pixel value or the decompression pixel value to be currently processed and a pixel value one cycle before in each periodic pattern area in a scanning direction in a specific section and determines one whose accumulation result is small, of prediction error absolute sums in respective periodic pattern areas as a periodic pattern area in the section.

11. The video compression encoding device according to claim 9, wherein the periodic pattern area detection unit further comprises a second prediction unit to calculate a prediction pixel value for predicting a current input pixel value on the basis of the image data, accumulates prediction error absolute sums outputted from the second prediction unit, in a scanning direction in a specific section, compares each prediction error absolute sum of each of the periodic pattern areas with a prediction error absolute sum by the second prediction unit, determines the section as the periodic pattern area when a prediction error absolute sum in any of the periodic patter areas is smaller and detects no periodic pattern area in the section when a prediction error absolute sum by the second prediction unit is smaller.

12. The video compression encoding device according to claim 10, wherein the periodic pattern area detection unit further comprises a second prediction unit to calculate a prediction pixel value for predicting a current input pixel value on the basis of the image data, accumulates prediction error absolute sums outputted from the second prediction unit, in a scanning direction in a specific section, compares each prediction error absolute sum of each of the periodic pattern areas with a prediction error absolute sum by the second prediction unit, determines the section as the periodic pattern area when a prediction error absolute sum in any of the periodic patter areas is smaller and detects no periodic pattern area in the section when a prediction error absolute sum by the second prediction unit is smaller.

13. The video compression encoding device according to claim 1, wherein the periodic pattern area detection unit detects a flat area by determining whether the latest matching times between a currently processed pixel value and a pixel value immediately before the value exceeds a predetermined value in the input pixel value or the decompression pixel value and removes the area from an area detected as the periodic pattern area.

14. The video compression encoding device according to claim 3, wherein the periodic pattern area detection unit detects a flat area by determining whether the latest matching times between a currently processed pixel value and a pixel value immediately before the value exceeds a predetermined value in the input pixel value or the decompression pixel value and removes the area from an area detected as the periodic pattern area.

15. A video generation device mounting a video compression encoding device according to claim 1 or 3 and comprising one or more functions of video imaging, video record and video edition.

16. A video output device mounting a video decompression device according to claim 2 or 4 and comprising one or more functions of video reception, video play and video display.

17. A non-transitory computer-readable, storage medium storing a video compression program that when executed causes a computer to perform a method comprising:
calculating a prediction pixel value for predicting a current input pixel value on the basis of image data;
calculating a prediction error value between the current input pixel value and the prediction pixel value;
determining a quantization function to quantize the prediction error value;
calculating a prediction error quantization value;
prediction error encoding to encode the prediction error quantization value and output the value as compressed data;
determining a decompression function to decompress a decompression pixel value on a decompression side from the prediction error quantization value and the prediction pixel value and give the value for prediction, to compress/encode the image data by prediction encoding and output the compressed data;
storing decompression pixel values outputted from the decompression function, for a predetermined number of pixels of pixels immediately before a focus pixel;
detecting a periodic pattern which included in the image data and in which a pixel value is regularly repeated in a scanning direction;
encoding information about the periodic pattern;
outputting the information including a period detection signal indicating how many cycles exist and a pixel code, as part of the compressed data and stopping an output of the prediction error encoding when the periodic pattern area is detected; and
reading a decompression pixel value before one cycle corresponding to the periodic pattern from the previous decompression pixel value storage, give the value to the prediction instead of a decompression pixel value outputted from the decompression function and also restore the value in the previous decompression pixel value storage when the periodic pattern area is detected.

18. A non-transitory computer-readable, storage medium storing a video decompression program that when executed causes a computer to perform a method comprising:
decompressing a prediction error decompression value from received compressed data;
calculating a prediction pixel value for predicting a current decompression pixel value;
calculating a decompression pixel value calculation to calculate the decompression pixel value from the prediction pixel value and the prediction error decompression value and output the value as image data and to decompress the image data from compressed data compressed/encoded by prediction encoding;
storing in a previous decompression pixel value storage decompression pixel values, outputted from the decompression pixel value calculation, for a predetermined number of pixels immediately before a focus pixel;
decompressing information including a period detection signal indicating how many cycles exist and a pixel code, about a periodic pattern included on an input pixel value from the compressed data;

reading a decompression pixel value one cycle before corresponding to the periodic pattern from the previous decompression pixel value storage; and outputting the value as the image data instead of a decompression pixel value outputted from the decompression pixel value calculation, and also re-store the value in the previous decompression pixel value storage when information about the periodic pattern is detected.

19. A non-transitory computer-readable, storage medium storing a video compression program that when executed causes a computer to perform a method comprising:

calculating a prediction pixel value for predicting a current input pixel value on the basis of image data;

calculating a prediction error value between the current input pixel value and the prediction pixel value;

determining a quantization function to quantize the prediction error value and calculate a prediction error quantization value;

prediction error encoding to encode the prediction error quantization value and output the value as compressed data;

determining a decompression function to decompress a decompression pixel value on a decompression side from the prediction error quantization value and the prediction pixel value and give the value for prediction and to compress/encode the image data by prediction encoding and output the compressed data;

storing in a previous decompression pixel value storage decompression pixel values outputted from the decompression function, for a predetermined number of pixels immediately before a focus pixel;

detecting a periodic pattern in which a pixel value is regularly repeated in a scanning direction;

encoding information about the periodic pattern;

outputting the information including a period detection signal indicating how many cycles exist and a pixel code, as part of the compressed data when the periodic pattern area is detected; and reading a decompression pixel value one cycle before corresponding to the periodic pattern from the previous decompression pixel value storage function and giving the value to calculate the prediction error value instead of the prediction pixel value when the periodic pattern area is detected.

20. A non-transitory computer-readable, storage medium storing a video decompression program that when executed causes a computer to perform a method comprising:

decompressing a prediction error decompression value from received compressed data;

calculating a prediction pixel value for predicting a current decompression pixel value;

calculating a decompression pixel value calculation to calculate the decompression pixel value from the prediction pixel value and the prediction error decompression value and output the value as image data and to decompress the image data from compressed data compressed/encoded by prediction encoding;

storing in a previous decompression pixel value storage decompression pixel values outputted from the decompression pixel value calculation, for a predetermined number of pixels immediately before a focus pixel;

decompressing information including a period detection signal indicating a how many cycles exist and a pixel code, about a periodic pattern included on an input pixel value from the compressed data;

reading a decompression pixel value one cycle before corresponding to the periodic pattern from the previous decompression pixel value storage; and outputting the value to the decompression pixel value calculation, instead of the prediction pixel value when information about the periodic pattern is detected.

* * * * *

UNITED STATES PATENT AND TRADEMARK OFFICE
CERTIFICATE OF CORRECTION

PATENT NO. : 8,599,918 B2
APPLICATION NO. : 12/759509
DATED : December 3, 2013
INVENTOR(S) : Shigeru Yoshida et al.

Page 1 of 1

It is certified that error appears in the above-identified patent and that said Letters Patent is hereby corrected as shown below:

In the Claims

In Column 31, Line 37, In Claim 11, delete "patter" and insert -- pattern --, therefor.
In Column 31, Line 52, In Claim 12, delete "patter" and insert -- pattern --, therefor.

Signed and Sealed this
First Day of April, 2014

Michelle K. Lee
*Deputy Director of the United States Patent and Trademark Office*